United States Patent [19]

O'Sullivan

[11] Patent Number: 5,353,334
[45] Date of Patent: * Oct. 4, 1994

[54] INTERFACE FOR CONNECTING COMPUTERS TO RADIO TELEPHONE NETWORKS

[75] Inventor: Harry M. O'Sullivan, Red Oak, Tex.

[73] Assignee: Spectrum Information Technologies, Inc., Manhasset, N.Y.

[*] Notice: The portion of the term of this patent subsequent to Jun. 30, 2009 has been disclaimed.

[21] Appl. No.: 178,474

[22] Filed: Jan. 6, 1994

Related U.S. Application Data

[60] Continuation of Ser. No. 866,879, Apr. 10, 1992, abandoned, which is a division of Ser. No. 531,762, Jun. 1, 1990, Pat. No. 5,127,041.

[51] Int. Cl.$^5$ ............................................. H04M 11/00
[52] U.S. Cl. ...................................... 379/59; 379/63; 379/98
[58] Field of Search ....................... 379/58, 59, 60, 63, 379/93, 96, 97, 98, 99, 100, 281, 339, 353, 443, 444; 455/33.1, 88

[56] References Cited

U.S. PATENT DOCUMENTS

| | | |
|---|---|---|
| 3,613,004 | 10/1971 | Wycoff . |
| 3,674,935 | 7/1972 | Lawrence . |
| 3,711,777 | 1/1973 | Tink . |
| 3,714,586 | 1/1973 | Mason . |
| 3,714,650 | 1/1973 | Fuller et al. . |

(List continued on next page.)

FOREIGN PATENT DOCUMENTS

| | | |
|---|---|---|
| 0295146 | 6/1988 | European Pat. Off. . |
| 0309627 | 4/1989 | European Pat. Off. . |
| WO87/00718 | 1/1987 | PCT Int'l Appl. . |
| WO89/05553 | 6/1989 | PCT Int'l Appl. . |
| WO90/03076 | 3/1990 | PCT Int'l Appl. . |
| 2170977 | 2/1986 | United Kingdom . |

OTHER PUBLICATIONS

AB3X Cellular Interface Owner's Manual, Morrison & Dempsey Communications, Nov. 1987.

(List continued on next page.)

*Primary Examiner*—Curtis Kuntz
*Assistant Examiner*—Dwayne D. Bost
*Attorney, Agent, or Firm*—Sixbey, Friedman, Leedom & Ferguson

[57] ABSTRACT

A system for connecting a computer to both cellular and landline telephone systems is disclosed. A cellular modem has a single RJ-11 jack for interfacing either to a landline jack or to a signal processing cable connected to a cellular transceiver. The analog data transmission signals of the modem, which are compatible with landline "tip" and "ring" lines, are provided on the third and fourth pins of the RJ-11 connector. When the modem is to be used as a landline modem, the RJ-11 connector is connected directly to a standard landline telephone jack using an ordinary modular telephone wire. When used with a cellular transceiver, the modem generates transceiver operation commands according to a predefined generic command language which is not specific to a particular transceiver. The generic commands are transmitted in serial digital form on the fifth terminal of the RJ-11 connector. The signal processing cable acknowledges the commands received via a serial digital signal transmitted to the second terminal of the RJ-11 connector. The signal processing cable then transmits control signals to the transceiver, with the signals being appropriate to the type of cellular transceiver used, to produce the function requested by the modem's universal command.

29 Claims, 13 Drawing Sheets

Microfiche Appendix Included
(1 Microfiche, 33 Pages)

U.S. PATENT DOCUMENTS

| | | |
|---|---|---|
| 3,745,251 | 7/1973 | Fretwell . |
| 3,766,479 | 10/1973 | Thalimer et al. . |
| 3,878,333 | 4/1975 | Shimizu et al. . |
| 3,899,772 | 8/1975 | Mead et al. . |
| 3,974,343 | 8/1976 | Cheney et al. . |
| 4,012,596 | 3/1977 | West, Jr. et al. . |
| 4,025,853 | 5/1977 | Addeo . |
| 4,109,283 | 8/1978 | Rast . |
| 4,284,849 | 8/1981 | Anderson et al. . |
| 4,415,774 | 11/1983 | Driver . |
| 4,419,756 | 12/1983 | Cheng-Quispe et al. . |
| 4,425,665 | 1/1984 | Stauffer . |
| 4,519,068 | 5/1985 | Krebs et al. . |
| 4,568,800 | 2/1986 | Orikasa . |
| 4,577,182 | 3/1987 | Millsap et al. . |
| 4,658,096 | 4/1987 | West, Jr. et al. . |
| 4,677,656 | 6/1987 | Burke et al. . |
| 4,680,787 | 7/1987 | Marry . |
| 4,697,281 | 9/1987 | O'Sullivan . |
| 4,718,080 | 1/1988 | Serrano et al. . |
| 4,737,975 | 4/1988 | Shafer . |
| 4,752,949 | 6/1988 | Steinbeck et al. . |
| 4,759,059 | 7/1988 | Christensen . |
| 4,775,997 | 10/1988 | West, Jr. et al. . |
| 4,837,800 | 6/1989 | Freeburg et al. . |
| 4,837,812 | 6/1989 | Takahashi et al. . |
| 4,852,146 | 7/1989 | Hathcock et al. . |
| 4,868,863 | 9/1989 | Hartley et al. . |
| 4,887,290 | 12/1989 | Dop et al. . |
| 4,890,315 | 12/1989 | Bendixen et al. . |
| 4,912,756 | 3/1990 | Hop . |
| 4,972,457 | 11/1990 | O'Sullivan . |
| 4,989,203 | 1/1991 | Phinney ............................. 455/88 |
| 4,991,197 | 2/1991 | Morris . |
| 5,127,041 | 6/1992 | O'Sullivan ........................... 379/63 |
| 5,131,019 | 7/1992 | Sheffer et al. . |
| 5,134,648 | 7/1992 | Hochfield et al. . |
| 5,142,568 | 8/1992 | Ogata et al. ......................... 379/100 |

OTHER PUBLICATIONS

Document cited in USPN 4,654,867 issued Mar. 31, 1987 entitled "Millicom Cellular Portable Telephone" article.

Excerpt from Digital Fundamentals, 3rd Edition by Thomas L. Floyd, Copyright 1986, pp. 562–569.

AT&T Dimsension PBX described in AT&T publication Bell System Practice Section 503-100-130, Issue 3, published Mar. 1981, which related to a multi-botton electronic telephone set.

AT&T 208A, Data Set product, Jul. 1975, Circuit Description, CD-1D232-01.

"Technical Aspects of Data Communication," John E. McNamara, Jul. 1979, Digital Press.

"A Tale of Two Modems," F. R. Derfler Jr., Aug. 21, 1984, PC Magazine.

"Advanced Mobile PhoneService: Control Architecture," Z. C. Fluhr & P. T. Porter, Bell System Technical Journal, vol. 58, No. 1, Jan. 1979.

"Advanced Mobile Phone Service: A Subscriber Set for the Equipment Test," R. E. Fisher, Bell System Technical Journal, vol. 58, No. 1, Jan. 1979.

"Overview of AMPS Mobile Call Processing System," Robert M. Fuller and Fred A. Epler, 1980 Annual Conference of the IEEE Vehicular Technology Society.

"Advance Mobile PhoneService," F. H. Blecher, IEEE transactions on Vehicular Technology, vol. VT-29, No. 2, Mar. 1980.

OTHER PUBLICATIONS

"Data Transmission for Mobile Radio," T. Brenig, IEEE Transactions on Vehicular Technology, VT-27, No. 3, Aug. '78.

"An 800 Mhz Approach to Underground Data Communications," T. M. Caridi and P. Mighdoll, IEEE 1981 Industry Applications.

"ARQ Schemes for Data Transmission in Mobile Radio Systems," R. A. Comroe and D. J. Costello, Jr., IEEE Transactions on Vehicular Technology, vol. VT-33, Aug. 1984.

"Optimal Blocklengths for ARQ Error Control Schemes," Joel M. Morris, IEEE Transactions on Communications, vol. COM-27, No. 2, Feb. 1979.

"Data Transmissions Over VHF and UHF Land Mobile Radio Channels," P. J. Cadman and R. L. Brewster, IEEE Proceedings vol. 130, Part F, No. 6, Oct. 1983.

"Data Signaling Functions for a Cellular Mobile Telephone System," V. Hachenburg, B. D. Holm, and J. I. Smith, IEEE Transactions on Vehicular Technology, vol. VT 26, No. 1, Feb. 1977.

"Quality of Service and Bandwidth Efficiency of Cellular Mobile Radio with Variable Bit-Rate Speech Transmission," D. J. Goodman and C. E. W. Sundberg, IEEE Transactions on Vehicular Technology, vol. VT-32, Aug. 1983.

AT&T's Dimension PBX described in AT&T publication Bell System Practice Section 503-100-130, Issue 3, published Mar. 1981, which relates to a multi-button electronic telephone set.

"R/F Lined Portable Digital Communications Sytem Overview," Proceedings of the National Electronics Conference (1984), Sep. 24-26, Rosemont, Ill., USA, J. Krebs, pp. 402-407.

"Portable Computer and Host Talk Over Radio-Frequency Link" Electronics, vol. 56, Aug. 25, 1983, J. Krebs.

"Cellnet adds data to Cellular service," International News Telephone Engineer and Management, Nov. 1, 1985.

"Celldata launched," British Telecom Journal, No. 3, (1985), vol. 6, Autumn.

Panasonic's "Easa-Phone" system described in Technical Guide KX-T 30810 for Panasonic's electronic modular switching system; and KX-T 30830 for its associated telephone station.

"Low Bit-Rate Speech Coders Applicable in Mobile Satellite Communications Systems", Neviano Dal Degan and Fulvio Russina, CSELT—Centrol Studi e Laboratori Telecommunicazioni S.p.A.—Via G. Reiss Romoli, 274—10148 Torino, Italy.

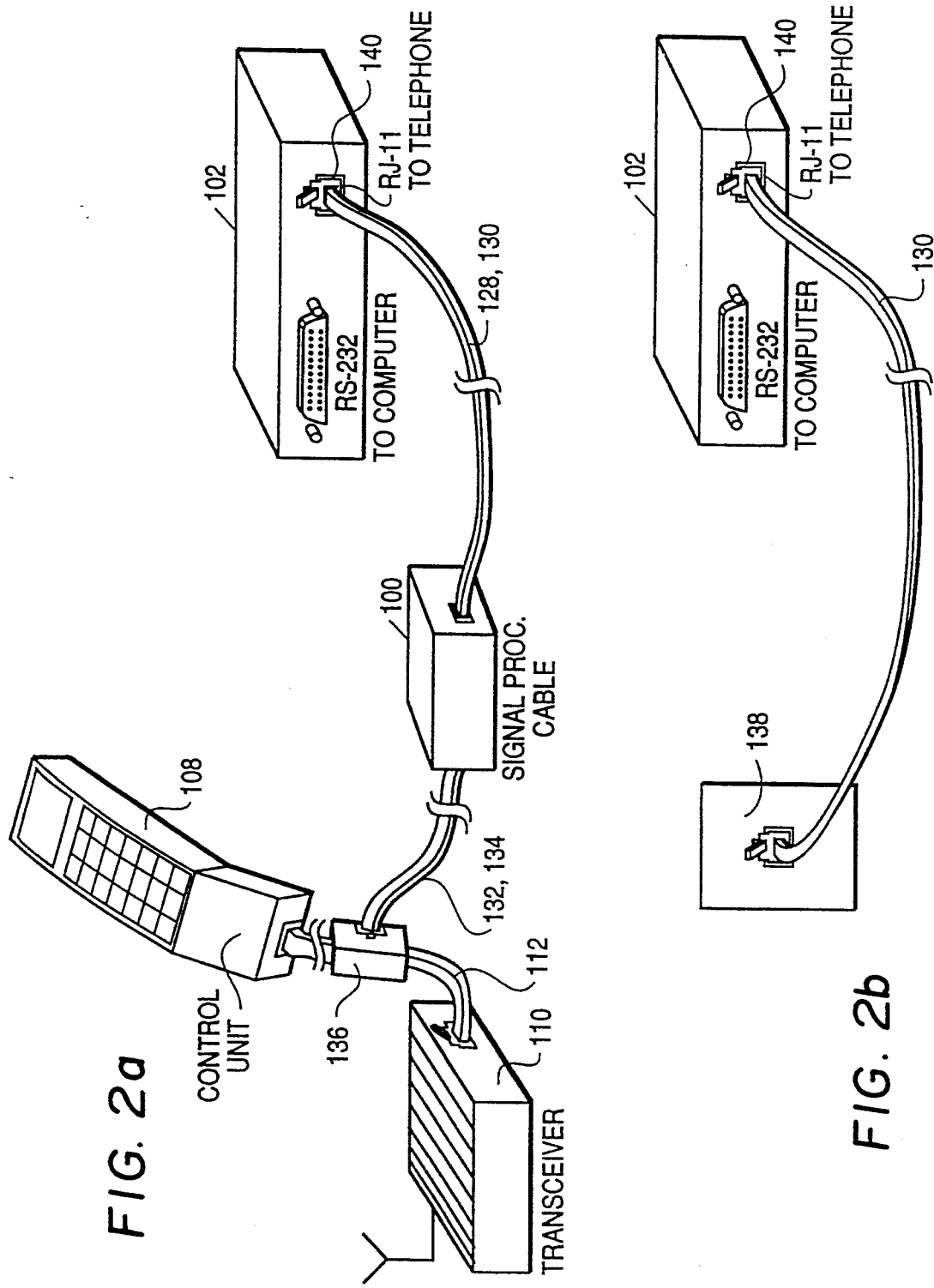

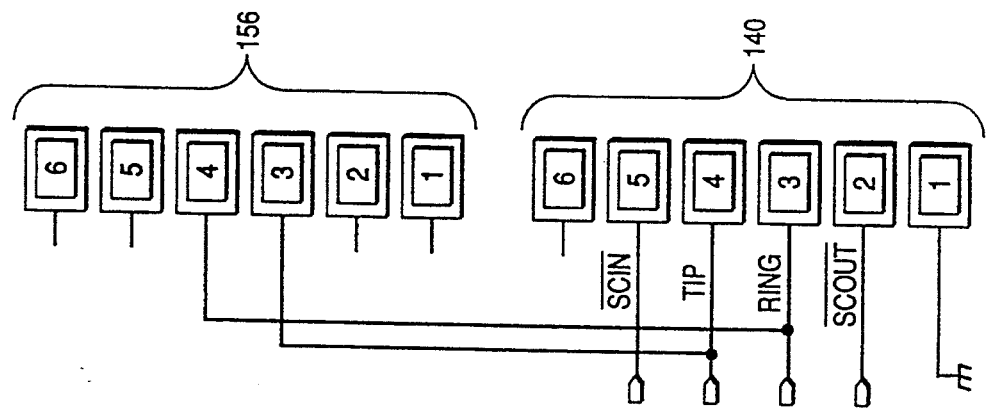
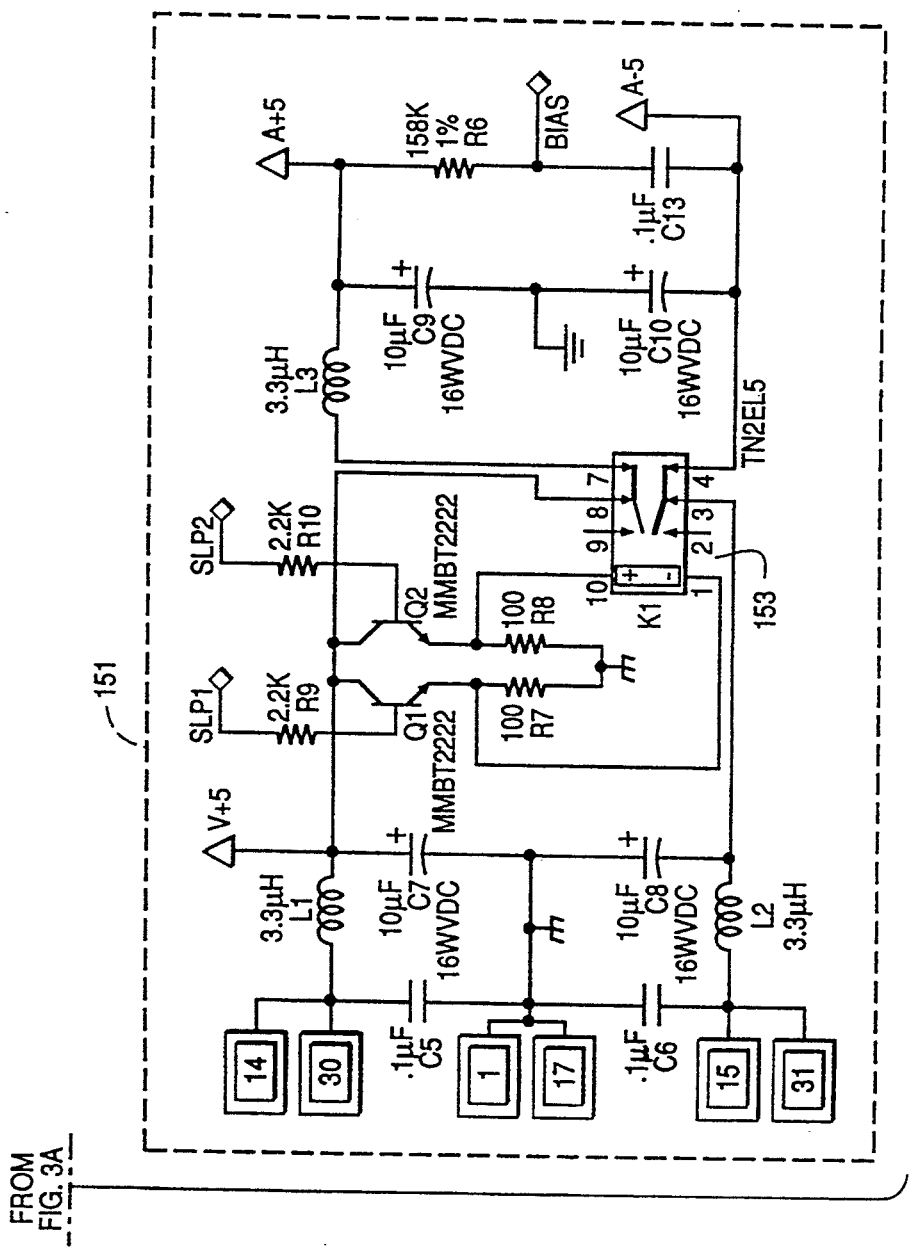
FIG. 3E
FIG. 3D

1

INTERFACE FOR CONNECTING COMPUTERS TO RADIO TELEPHONE NETWORKS

This application is a continuation of Ser. No. 07/866,879, filed Apr. 10, 1992, now abandoned, which is a division of Ser. No. 07/531,762 filed Jun. 1, 1990, now U.S. Pat. No. 5,127,041.

BACKGROUND OF THE INVENTION

This file contains a microfiche appendix consisting of 1 microfiche having 33 pages.

The present invention is a novel modem and interfacing system that permits connection of a single cellular-capable modem to a variety of cellular transceivers or to a landline telephone jack.

In the prior art, modems specifically designed for cellular use were designed to connect to a single type of cellular bus. For example, the inventor's prior U.S. Pat. No. 4,697,281 describes one of the earliest commercially successful cellular modems. This modem includes integral interfacing software and hardware that is specific to the type of cellular transceiver used with the modem. Thus, a modem designed to work, for example, with a Motorola transceiver will not operate with an Oki transceiver. It would be desirable to develop a system that would permit a single, generic modem to operate with a variety of transceivers.

These prior art modems also are not designed to interface conveniently with a landline telephone jack. To interface with a landline telephone jack, these modems would have to be provided with separate landline connection hardware and operating software, adding cost and complexity. Because cellular modems are relatively expensive, it would be desirable to use a single modem for a variety of mobile and fixed-station data transmission tasks. The inability of a single modem to function easily in both environments is particularly troublesome when the modem is installed internally in a portable computer. If a portable computer is equipped with a modem that operates only in the cellular environment, an auxiliary modem must be provided to allow data transmission when the portable computer is used in an office setting. Similarly, if the portable computer's internal modem is not cellular-compatible, a separate cellular modem must be carried with the mobile unit. The need to carry a separate cellular modem with significant weight and dimensions reduces the convenience and portability, and thus the usefulness, of the portable computer/cellular telephone combination. Therefore, the lack of landline capability is a significant disadvantage for cellular modems.

The prior art includes systems which are distantly related to the system of the present invention, but none of these prior art systems provides a method of selectively connecting a single cellular-capable modem to a variety of cellular transceivers or to a landline telephone jack.

Some prior art interfacing systems, which will be referred to as telco emulators, permit operative connection of a variety of ordinary analog telephone sets to cellular transceivers by simulating a landline telephone connection. Such systems are disclosed in U.S. Pat. Nos. 4,737,975 to Shafer, 4,775,997 and 4,658,096 to West, Jr. et al., and 4,718,080 to Serrano et al. U.S. Pat. No. 4,012,596, also to West, Jr. et al., shows a similar system for connecting an ordinary telephone device to a simplex radio system. U.S. Pat. No. 4,887,290 to Dop et al. shows a cellular alarm backup system which can selectively connect either ordinary house phones or a digital alarm communicator to a cellular transceiver. It should be noted that, for reasons explained in the inventor's prior U.S. Pat. No. 4,697,281, an ordinary home or office modem will not function properly in a cellular environment.

Telco emulators have been used to connect modems to cellular transceivers. For example, U.S. Pat. No. 4,837,800 to Freeburg, et al. shows a telco emulator, the Motorola "CELLULAR CONNECTION," used to connect a cellular modem to a cellular transceiver. However, the telco emulator suffers from a high cost of production. These emulators must provide for Tip and Ring current, ringing voltage, and DTMF (touch-tone) reception and decoding. Each of these functions adds cost and complexity to the telco emulator. Further, the telco emulator must address the special dialing needs of the cellular transceiver, such as generating a SEND command. The telco emulator is also incapable of returning detailed status information and data from the cellular telephone to the connected device, since the telco emulator assumes that the device is not programmed to operate in a cellular environment. As a result of all these factors, the telco emulator method provides suboptimal control of the cellular transceiver in cellular modem applications as compared to the system of the present invention.

Radiotelephone interfacing systems not related to modems have also been developed in the prior art. U.S. Pat. No. 4,852,146 to Hathcock et al. shows an auxiliary dialing system that connects between a cellular handset and a cellular transceiver, but this system does not connect a generic device to a specific cellular transceiver. U.S. Pat. No. 4,752,949 to Steinbeck et al. discloses an interface system for connecting a cordless telephone to a base unit by installing a cord. The cord includes both data signal lines and control lines.

It is well-known in the landline PBX art to transmit both digital control and analog information signals through the same connector in a modular telephone wiring system. Some of these systems, as exemplified by the system disclosed in U.S. Pat. No. 4,759,059, to allow ordinary analog telephone devices to connect to a digital telephone system. The analog devices then use analog lines of the telephone system but are not connected to digital control lines of the telephone system.

Finally, it is also known to connect a plurality of telephone units to one or more cellular transceivers, as illustrated in U.S. Pat. Nos. 4,890,315 to Bendixen et al. and 4,568,800 to Orikasa.

However, none of the prior art systems disclose a single, cellular-capable modem and cost-effective means that permit selective connection of the modem either to a variety of cellular transceivers or to a landline telephone jack.

SUMMARY OF THE INVENTION

It is a general object of the present invention to provide a novel system and method for accessing telephone networks of two or more differing types to communicate information using one of the telephone networks.

It is a general object of the present invention to provide a novel cellular modem system including a generic modem and a cellular transceiver-specific interface cable.

It is another object of the present invention to provide a novel cellular-capable modem which is adapted for ready connection either to a landline telephone jack or to a variety of cellular transceivers.

Another object of the present invention is to provide a novel interface cable device for connecting the aforementioned cellular-capable modem to a specific cellular transceiver.

A further object of the present invention is to provide a novel interface cable device adapted to connect a cellular-capable modem to a plurality of cellular transceivers.

It is a more specific object of the present invention to provide a novel cellular-capable modem which is provided with a single jack for connecting either to a landline telephone connector or to a variety of cellular transceivers.

Another object of the present invention is to provide a novel cellular-capable modem which can selectively transmit cellular transceiver control commands when the modem is connected to a cellular transceiver.

A further object of the present invention is to provide a novel cellular-capable modem that communicates with an interface cable connecting the modem and a cellular transceiver by using a generic command language, causing the interface cable to control the transceiver in a desired manner.

Yet another object of the present invention is to provide a novel interface cable which receives generic command language instructions from a cellular modem and produces signals adapted to control a cellular transceiver.

A further object of the present invention is to provide a novel modem for installation in a portable computer which can be used with either a cellular or a landline telephone system.

It is also an object of the present invention to provide a novel modem for installation in a portable computer which has a single connector permitting use of the modem with either a landline or a cellular telephone system.

An object of the present invention is to provide a novel modem for installation in a portable computer which produces generic command signals to control a cellular telephone connection.

It is also an object of the present invention to provide a novel system for interfacing a modem to a telephone system access device in which the modem transmits and receives generic command language signals to induce control of telephone system access device operation, and in which the generic command language signals are retransmitted if receipt of the signals is not acknowledged.

Another object of the present invention is to provide a novel interface device for connecting a cellular modem to a cellular telephone system including a control unit and a transceiver, which replaces a portion of a cellular bus connecting the control unit to the transceiver.

Yet another object of the present invention is to provide a novel system for connecting a cellular transceiver to a cellular data modem in which modulated data signals are carried on a first set of conductors and digital control signals are carried on a second set of conductors.

A further object of the present invention is to provide a novel system for interfacing a cellular modem to a cellular telephone which provides a signal imitative of a landline ring signal to the cellular modem when the cellular telephone signals an incoming call.

Another object of the present invention is to provide a novel cellular modem and a novel interface system for connecting the modem to a cellular telephone which communicate using a predefined command language and which generate signals acknowledging the receipt of command language signals.

A further object of the present invention is to provide a novel command language useful in arranging the interface between cellular modems and cellular telephone networks which includes commands for generating cellular telephone keypress signals and for obtaining cellular telephone status information.

It is also an object of the present invention to provide a novel system for sensing the connection of a cellular telephone interface cable to a cellular modem.

Another object of the present invention is to provide a novel system and method for establishing communication between a telephone system interface cable and a modem after these two devices are connected.

It is also an object of the present invention to provide a novel interface cable for connecting a cellular telephone to a modem which receives digital commands from the modem and controls thereby the operation of the cellular telephone and the transmission of computer data through analog computer data transmission lines connecting the modem to the cellular telephone.

These objects and others which will be apparent from the specification herein and the scope of the claims are achieved by providing a cellular modem having a single RJ-11 jack for interfacing either to a landline or to a cellular transceiver. The analog data transmission signals of the modem, which are compatible with landline "tip" and "ring" lines, are provided on the third and fourth terminals of the RJ-11 connector. When the modem is to be used as a landline modem, the RJ-11 connector can be connected directly to a standard landline telephone jack using an ordinary modular telephone wire.

If the modem is to be used with a cellular transceiver, the modem generates transceiver operation commands according to a predefined universal command language which is not specific to a particular transceiver. The modem's RJ-11 connector is connected to the cellular transceiver using an appropriate interface cable which includes a microprocessor (a "signal processing cable"). The universal language commands are transmitted in serial digital form on the fifth terminal of the RJ-11 connector. The signal processing cable acknowledges the commands received and alerts the modem to cellular-telephone-related events via a serial digital signal transmitted to the second terminal of the RJ-11 connector. The signal processing cable then transmits control signals to the transceiver, with the signals being appropriate to the type of cellular transceiver used, to produce the function requested by the modem's universal command.

The system disclosed has substantial advantages over prior art systems for interfacing modems to cellular and landline telephone systems. With the system disclosed herein, a single modem can be connected to a landline jack or to any desired brand of cellular transceiver merely by inserting the proper cable into the modem's RJ-11 jack. The single, familiar jack design is foolproof in that it allows the user to confidently and successfully connect the modem to a desired telephone system with minimal instruction or technical understanding of modem operation.

Further, the provision of a universal command language permits the modem to be designed independently of the specifications of the cellular transceivers to which it will be connected. The signal processing cable provides a consistent interface for the modem. Economies of scale will result from producing only one type of modem, rather than making a different modem for each cellular transceiver standard. In addition, the design of the present system will allow the manufacturer to respond faster and more cost-effectively to the introduction of new cellular transceiver standards since these new standards will only require design of a new signal processing cable. While telco emulators also offer the advantage of providing a consistent interface for the modem, these emulators are more complex and thus more expensive to produce than the system of the present invention. These emulators also provide less effective control over the cellular transceiver.

The universal command language also allows the same modem to be used with an infinite variety of cellular transceivers by merely substituting a different signal processing cable. Thus, a modem owner who obtains a new cellular telephone need only purchase a relatively inexpensive signal processing cable, rather than replacing the entire modem.

In addition, a single modem that can operate through a single jack in both landline and cellular environments will be particularly useful in portable computer applications, where space for additional jacks is limited and additional packages, such as extra modems, are quite undesirable.

Other objects and advantages of the present invention will become apparent to those skilled in the art upon review of the specification and drawings herein.

BRIEF DESCRIPTION OF THE DRAWINGS

FIG. 2a is an assembly diagram showing the connection of the signal processing cable of the present invention between a cellular transceiver and the modem of the present invention.

FIG. 2b is an assembly diagram showing the connection of an ordinary modular telephone cable between a landline telephone jack and the modem of the present invention.

FIGS. 3a through 3e together form a schematic diagram of a preferred embodiment of the modem section of the cellular data modem of the present invention designed for installation in a portable computer.

DETAILED DESCRIPTION OF A PREFERRED EMBODIMENT

Figure 1:
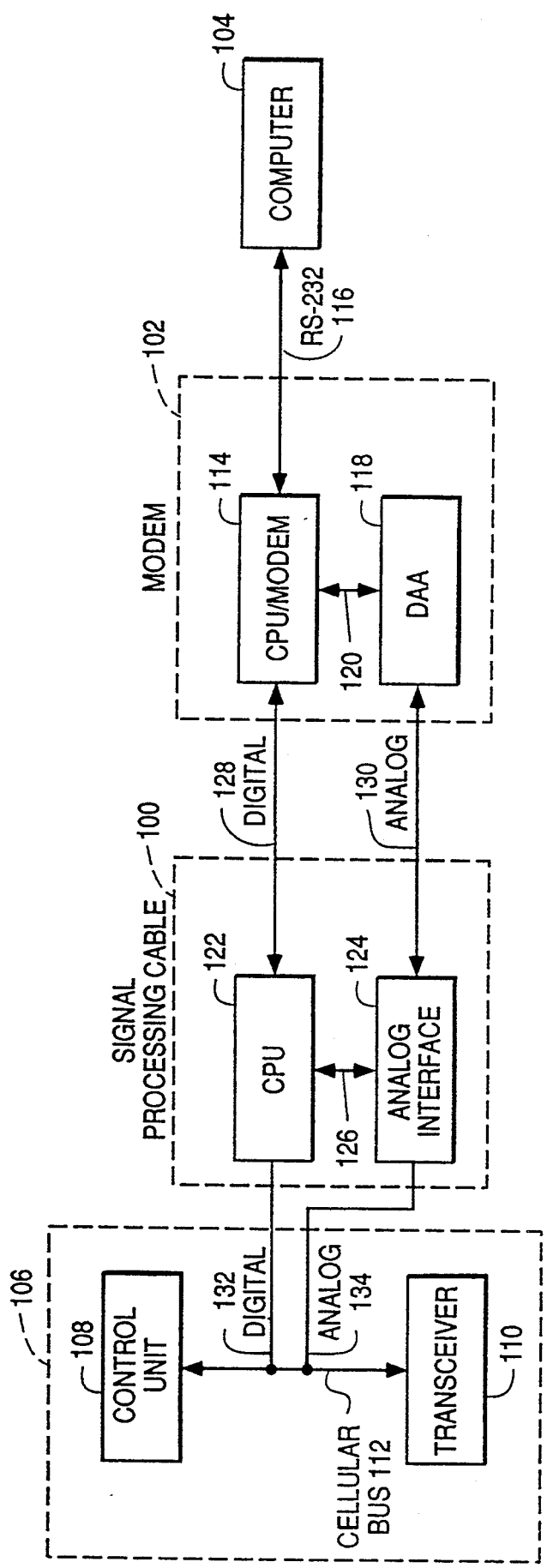
FIG. 1 is a block diagram showing the operational connection of the modem and signal processing cable of the present invention.

Referring first to FIG. 1, the data interfacing system of the present invention comprises two unitary component devices: a signal processing cable 100 and modem 102. The signal processing cable 100 and modem 102, and associated cabling, connect a computer 104 to a cellular telephone 106. Cellular telephone 106 may be any known type of cellular telephone and includes a control unit 108 connected to a cellular transceiver 110 by a cellular bus 112. The modem 102 includes a CPU/modem section 114, which may be connected to the computer 104 by an RS-232 interface cable 116. The CPU/modem section 114 is connected to DAA section 118 by analog signalling and digital control lines 120. The signal processing cable 100 includes a CPU section 122 and an analog interface section 124, connected by digital control lines 126. The CPU 122 of signal processing cable 100 is connected by digital data lines 128 to the CPU/modem section of modem 102. The analog interface section 124 of signal processing cable 100 is connected by analog data lines 130 to the DAA section 118 of modem 102. The CPU section 122 of signal processing cable 100 is also connected by digital data lines 132 to digital data lines of the cellular bus 112. The analog interface section 124 of signal processing cable 100 is connected by analog data lines 134 to analog transmission lines of the cellular bus 112.

If the modem 102 is used to connect to a cellular telephone network (not shown) using the cellular transceiver 110, the CPU/modem section 114 of modem 102 will generate generic cellular telephone operation commands according to a predefined universal command language, which is not specific to a particular cellular telephone 106. Some of these generic command language commands may be specifically designed to function only with a subset of the existing body of cellular telephones, but by the term "generic command language" it is meant that at least some of the commands will be generic. The generic command language signals are transmitted as serial digital signals over digital data lines 128 to the CPU 122 of signal processing cable 100. The CPU 122 of signal processing cable 100 is programmed to acknowledge the commands received via another serial digital signal transmitted on digital data lines 128. The signal processing cable 100 then generates device-specific command language signals which are transmitted via digital data lines 132 to the cellular bus 112. These device-specific command language signals are designed to emulate signals produced by the control unit 108 to produce desired control functions of transceiver 110 according to the generic command language command that was received from CPU modem section 114 of modem 102.

Figure 2C:
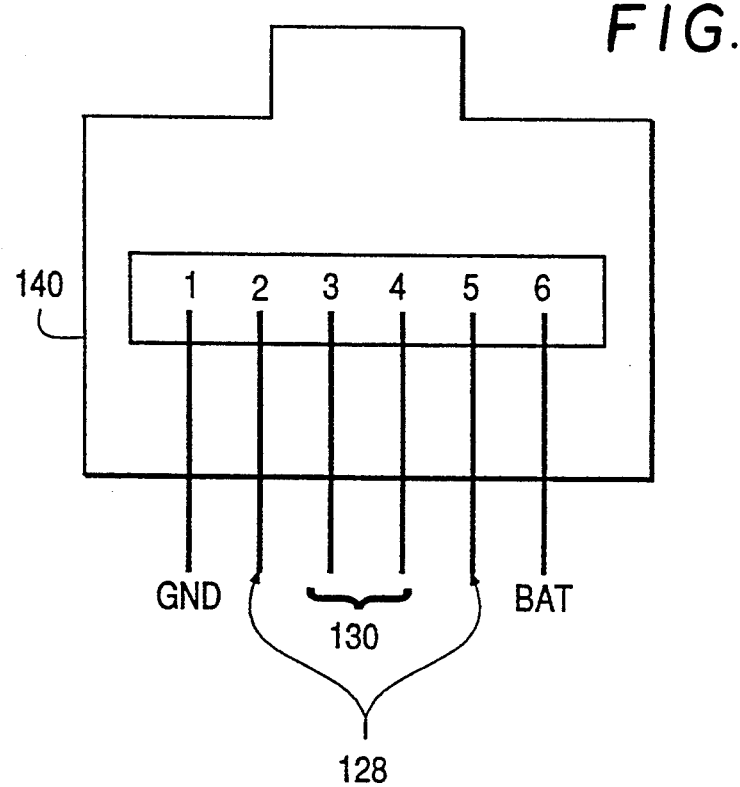
FIG. 2c is a diagram of a standardized, unitary electrical connector used, as shown in FIGS. 2a and 2b, to connect the modem of the present invention to landline telephone systems or to other types of telephone systems.

The modem 102 of the present invention can be used with either a cellular telephone system or with a landline telephone system. In FIG. 2a, use of the modem 102 with a cellular telephone system is illustrated. The modem 102 is shown connected via signal processing cable 100 to a three-way connector 136 interposed in cellular bus 112. In FIG. 2b, the modem 102 is shown connected to a landline telephone system. For landline use, the modem 102 is connected via an ordinary modular telephone cable containing analog lines 132 to a landline RJ-11 jack 138. As shown in FIGS. 2a, 2b, and 2c, modem 102 is provided with a standard 6-position RJ-11 jack 140 for connecting either to the landline telephone jack 138, or to the cellular bus 112 via the signal processing cable 100. The six terminals of the RJ-11 jack carry the signals indicated in Table A. The method developed to transmit signals from the modem 102 to the signal processing cable 100 and the assignment of signals to terminals, as shown, is a novel feature of the invention and has particular utility. The modulated data signals that are to be transmitted and received by the modem 102 are transmitted and received on the TIP and RING lines. These lines are assigned to pins three and four respectively of the RJ-11 jack 140. The assignment of the analog data signals to transmission lines separate from control data transmission lines, and particularly to the terminals three and four, which correspond to the TIP and RING terminals used by landline RJ-11 connections, allows the RJ-11 jack 140 of the modem to be connected directly to the landline telephone jack 138 using a standard modular line cord as shown in FIG. 2b. In the preferred embodiment, the TIP and RING lines are not provided with a DC signal by the signal processing cable, but of course a DC level signal could be added if desired.

The GND signal on pin 1 of the RJ-11 jack 140 serves as a reference ground for all the analog and digital signals carried through the RJ-11 jack 140. The BAT voltage is provided directly from the cellular telephone bus 112. The voltage and current provided or the BAT terminal will vary depending on the model of the cellular telephone 106. Typically, the cellular bus 112 will provide the BAT terminal with at least 120 mA at 7.5 volts DC. The BAT signal in some cases may also be switched on and off by the cellular telephone 106.

TABLE A

RJ-11 ELECTRICAL CONNECTIONS

| PIN | FUNCTION |
|---|---|
| 1 | GND - common ground |
| 2 | SCOUT - serial data from signal processing cable |
| 3 | TIP - signal processing cable analog transmit |
| 4 | RING - signal processing cable analog receive |
| 5 | SCIN - serial data to signal processing cable |
| 6 | BAT - signal processing cable provided DC voltage |

When the modem 102 is to be used in a cellular environment, as shown in FIG. 2b, the SCOUT (Serial Cable OUTput) and SCIN (Serial Cable INput) serial digital data signals on pins two and five of the RJ-11 jack 140, respectively, are used to transmit the generic command language signals. The SCOUT and SCIN lines thus correspond to the digital data lines 128 shown in FIG. 1. The transmissions on SCOUT and SCIN might be programmed to occur regardless of whether the modem 102 is being used in a cellular environment, but it is preferred that these transmissions occur only when the signal processing cable 100 is connected to the modem 102.

The preferred serial commands transmitted between the signal processing cable 100 and the modem 102 on the SCIN and SCOUT lines are shown in Table B. As shown, each command code consists of two hexadecimal digits which combine to form a single byte code. Naturally, numerous other command codes of varying types and lengths could be assigned to the functions shown, and additional desired functions could be implemented. For example, the descriptions of the command functions in Table B could themselves be transmitted in ASCII form as English-language command codes.

TABLE B

GENERIC SIGNAL PROCESSING CABLE COMMAND LANGUAGE

| COMMAND (HEX) | FUNCTION |
|---|---|
| 00 | Smart Cable Acknowledge (SCACK) |
| 01 | Emulate keypress "1" |
| 02 | Emulate keypress "2" |
| 03 | Emulate keypress "3" |
| 04 | Emulate keypress "4" |
| 05 | Emulate keypress "5" |
| 06 | Emulate keypress "6" |
| 07 | Emulate keypress "7" |
| 08 | Emulate keypress "8" |
| 09 | Emulate keypress "9" |
| 0A | Emulate keypress "0" |
| 0B | Emulate keypress "SEND" |
| 0C | Emulate keypress "END" |
| 0D | Emulate keypress "LOCK" |
| 0E | reserved for future use |
| 0F | Modem acknowledge (MACK) |
| 10 | Data call initiate |
| 11 | Put cellular phone ON HOOK |
| 12 | Take cellular phone OFF HOOK |
| 20 | Status information request |
| 21 | Status information response |
| 22 | Display information request |
| 23 | Display information response |
| 24 | Debug request |
| 55 | Alert information |

As a particular feature of the invention, all commands transmitted will be acknowledged with either the SCACK or MACK signal, as appropriate, when execution is complete. If a command has not been acknowledged within three seconds, the device sending the command (either the modem 102 or the signal processing cable 100) will assume that the transmission was garbled and retransmit the information. If the device that is to receive the information fails to respond after three consecutive transmissions, the transmitting device will assume that the other device is disconnected or turned off. The transmitting device will then cease attempts to communicate and generate a signal informing the user or the computer of the failure. For example, if the signal processing cable 100 fails to respond to the modem 102 three times in a row, the modem may send a signal to the computer 104 indicating that the modem 102 is not connected to the cellular telephone 106. Or, the modem 102 could energize a display device such as a light-emitting diode.

The "emulate keypress" commands to the signal processing cable 100 (01-0D) direct the signal processing cable 100 to generate signals to the cellular transceiver that are equivalent to the signals generated by the cellular control unit when the specified key is pressed on the control unit. The data call initiate command (10) directs the signal processing cable to put the cellular phone into proper condition for data transmission, including putting the cellular phone IN USE, setting proper hook condition, establishing proper TX and RX paths, turning off speakerphone, et cetera.

The status information response code (21) is transmitted by the signal processing cable in response to a status information request code (20). The status information response code (21) is followed by a single byte of information, each bit of which represents transceiver status as shown in Table C. A "1" in a bit indicates that the specified condition is in effect. The additional available bits, 4–7, can be assigned to indicate any desired operational condition of the cellular telephone which can be determined by analysis of a signal transmitted over the cellular bus 112.

TABLE C

| STATUS INFORMATION RESPONSE BYTE | |
|---|---|
| BIT | CONDITION |
| 0 | IN USE |
| 1 | NO SERVICE |
| 2 | LOCK |
| 3 | ROAM |
| 4–7 | reserved for future use |

The display information request command (22) requests transmission by the signal processing cable of the contents of the cellular control unit display. The signal processing cable responds to the display information request command with a display information response code (23), followed by a 32-byte ASCII representation of the current characters displayed on the control unit screen. Leading display elements are filled with null characters (ASCII 0).

The debug request command (24) is used during development and testing to transmit data directly to the cellular telephone bus 112. The modem 102 transmits the debug request command to the signal processing cable 100, followed by a single byte representing the number of bytes to be transmitted to the cellular bus 112. The bytes to be transmitted to the cellular bus 112 are then sent. The signal processing cable 100 passes these data bytes directly to the cellular bus 112 without translation of the base data. However, the signal processing cable 100 will provide the data to cellular bus 112 with byte formatting and protocols appropriate to the cellular bus 112. The debug request command (24) could also be used to transmit signals specific to the cellular telephone being used under control of the computer 104 or of the modem user. In this way, non-generic command signals could be generated by the signal processing cable 100. A similar command could also be provided to permit modem 102 to receive non-generic responses from cellular bus 112.

When the cellular telephone 106 rings, an alert sequence is generated by the signal processing cable 100. This alert sequence begins with a 25 Hertz square wave transmitted on SCOUT. The square wave follows the cadence of the cellular telephone ringing tone, typically one second on followed by two seconds off. An alert information code (55) is then generated by the signal processing cable 100, between 200 and 300 milliseconds after each square wave transmission. Preferably, the alert information code is generated 250 milliseconds after an alert sequence. For example, if the cellular telephone 106 rings twice, two cadences of 25 Hz waves and two alert information codes (55) will be generated. The alert sequence signal is a particular feature of the present invention. This signal has similar frequency and timing characteristics to the ringing signal commonly generated on landline telephones. Many currently manufactured modems are designed to recognize as ringing signals incoming signals which have frequencies of 20–60 Mz. and which are repeated periodically. Therefore, provision of a signal by signal processing cable 100 which corresponds to this requirement is a valuable feature, because the ringing detection circuitry of currently popular cellular modems will not require redesign to be compatible with the signal processing cable standard.

The SCACK signal and the MACK signal are not used in communication of the alert sequence. In fact, signal processing cable 100 will be programmed to ignore all information presented to SCIN from the time transmission of the square wave begins until 10 milliseconds after the "55" alert information code is transmitted.

The modem 102 uses this alert information code to determine whether it is a cellular telephone or a landline that is ringing. The absence of an alert information code from the signal processing cable 100 will indicate to the modem 102 that a landline call is coming in.

The wakeup sequence interaction of the signal processing cable 100 and the modem 102 will now be described in detail. This sequence occurs when the signal processing cable 100 is plugged into the RJ-11 jack 140 of modem 102. The signal processing cable 100 and the modem 102 detect this connection by monitoring the SCIN and SCOUT lines. The CPU 122 of signal processing cable 100 and the CPU/modem section 114 of modem 102 are provided with bidirectional input/output ports for the SCIN and SCOUT lines. When the signal processing cable 100 and the modem 102 are turned on, these input/output ports are initialized as input ports. The signal processing cable 100 provides a pullup for the SCIN line, and the modem 102 provides a pullup for the SCOUT line, but the signal processing cable 100 does not have a pull up for the SCOUT line and the modem 102 does not have a pull up for the SCIN line. Thus, when the signal processing cable 100 is connected to the modem 102, the SCIN line port of modem 102 is pulled up by signal processing cable 100 to produce a digital "0" signal at the SCIN line port of modem 102. This digital signal can be read by the CPU/modem section 114 of modem 102, informing the modem 102 that the signal processing cable 100 has been connected to modem 102. Similarly, the SCOUT line port of the signal processing cable 100 will be pulled up upon connection by the modem 102. The processors of modem 102 and signal processing cable 100 may poll the SCIN and SCOUT lines respectively to determine when attachment has occurred, or the changed signals upon attachment could be used to generate an interrupt signal to CPU 122 or CPU/modem section 114 respectively. Thus, the unique design of the pullups for the SCIN and SCOUT lines, when combined with the software described herein, allows detection of the connection of the signal processing cable 100 to the modem 102. While the pullup arrangement described is the preferred means of providing connection sensing, it would also be possible within the scope of the present invention to use other methods, such as for example switches responding to the physical insertion of a connector, or "wire loop" connections from one terminal on a plug to another terminal, operable to connect two or more terminals of the receiving jack when the plug is inserted.

The wakeup sequence is preferably also programmed to execute if the signal processing cable 100 determines that the modem no longer recognizes the connection of signal processing cable 100 to modem 102. The signal processing cable 100 might make this determination, for example, if a ring signal from the signal processing cable 100 is not answered by the modem 102 or if the modem 102 replies to a signal of signal processing cable 100 with an incorrect protocol. There are a number of reasons why the modem 102 might cease to recognize the connection of the signal processing cable 100. As an example, the user of the modem 102 might have turned the modem off and turned it back on.

In the preferred embodiment, the signal processing cable 100 will initiate the wakeup sequence upon detecting the connection of signal processing cable 100 to the modem 102. When the signal processing cable 100 determines that a wakeup sequence should be transmitted, the signal processing cable 100 will transmit digital signals on the SCOUT line at its maximum available speed, generally either 4800, 2400, 1200, or 300 bits per second. The initial signal transmitted by signal processing cable 100 will be 16 bits of alternating "1"s and "0"s, starting with a "1"(ground). The modem 102 will be programmed to respond to the wakeup sequence transmission from the signal processing cable 100. The modem 102 will wait eight bit periods following receipt of the 16th bit of the initial wakeup signal from signal processing cable 100. Modem 102 will then transmit the same initial signal to signal processing cable 100 on the SCIN line. Within eight bit periods after receiving the 16th bit of the signal from modem 102, the signal processing cable 100 will transmit a SCACK signal on the SCOUT line according to the protocols in Table B. Within eight bit periods after receiving the SCACK signal, the modem 102 will transmit a MACK signal on the SCIN line according to the protocols shown in Table B.

If the wakeup sequence is not completed correctly, the signal processing cable 100 will be programmed to reinitiate the wakeup sequence until the sequence is completed correctly or until the sequence has failed a specified number of times. For example, if the sequence fails four consecutive times, the signal processing cable 100 might be programmed to attempt no further wakeup sequences. The signal processing cable 100 might also be programmed to signal an error, by displaying a message on the screen of cellular control unit 108, activating a light emitting diode, etc. If the wakeup sequence fails at any time, the modem 102 will enter a wait state and do nothing until the signal processing cable 100 reinitiates the wakeup sequence. Alternatively, the modem 102 may assume that a landline-compatible connection has been provided and proceed in an operational mode appropriate to a landline environment. If an attempted wakeup sequence has failed in this manner and the modem 102 has reverted to a landline operational mode, the modem 102 will preferably provide a signal to the computer 104 or the user indicating that the wakeup sequence failed.

Figure 7A:
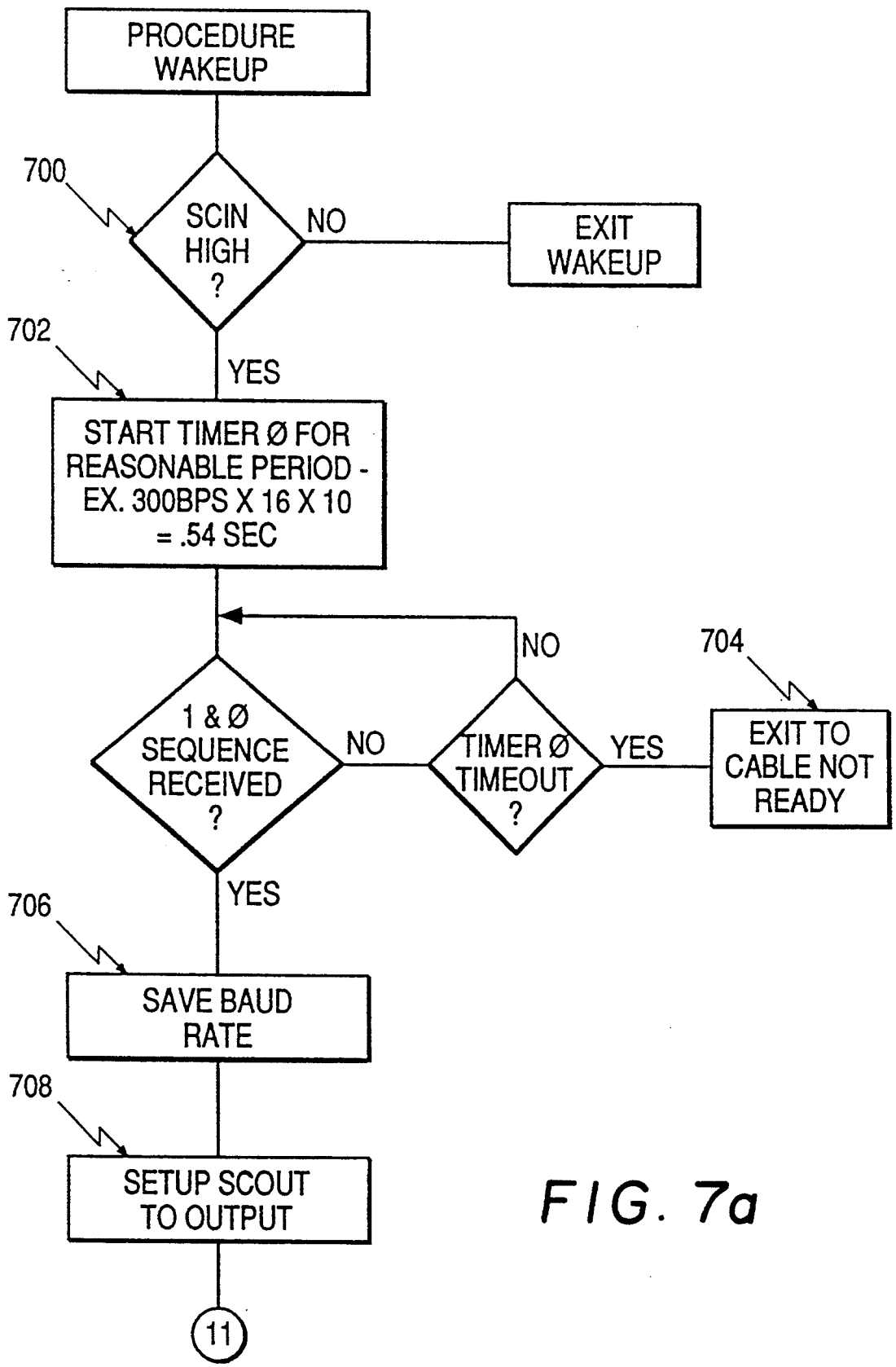
FIGS. 7a and 7b together constitute a flowchart for the wakeup procedure of the modem of the present invention.
Figure 7B:
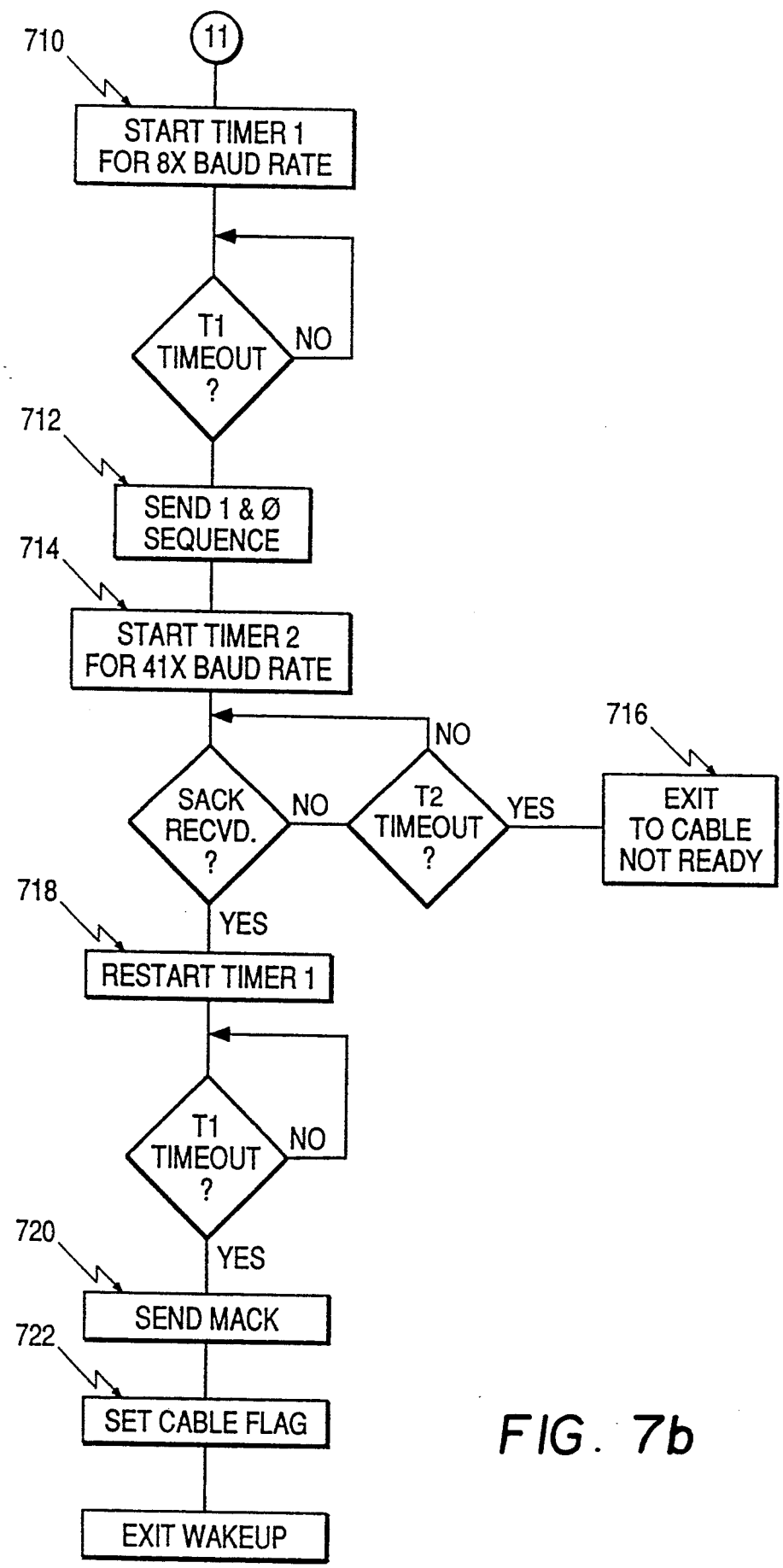

FIGS. 7a and 7b together constitute a flowchart for the wakeup procedure of modem 102. The wakeup procedure does not operate until the SCIN line input to modem 102 goes high as shown in block 700. Thereafter, a timer TIMER0 is started as shown in block 702, which may be a 0.54 second timer if 300 baud communications are used. If the alternating 1 and 0 sequence is not received before timeout of TIMER0, the cable is not ready and block 704 operates to transfer control to the exit-cable not ready procedure of FIG. 9. If the alternating 1 and 0 sequence is received correctly, the modem 102 will determine the baud rate of the transmission and save an indication of the baud rate in memory for future reference as indicated in block 706. The SCOUT line is then set up for output in block 708. A timer TIMER1 is begun in block 710, with the timer TIMER1 being set for the length of time required to transmit eight bits at the baud rate noted in block 706. After the timer TIMER1 times out, a reply sequence is transmitted as shown in block 712. A timer TIMER2 is then activated as shown in block 714 for the period of time required to send 41 data bits at the baud rate noted in block 706. If a SCACK signal is not received from the signal processing cable 100 within the period of TIMER2, control is transferred to block 716 which causes the exit-cable not ready procedure of FIG. 9 to be executed. The TIMER1 timer is then restarted to produce a delay equivalent to eight bit transmission time periods. After the TIMER1 timer times out, the modem 102 sends a MACK signal as shown in block 720 and sets a "cable" flag in the memory of modem 102 indicating that communications have been established with the signal processing cable 100, as shown in block 722.

Figure 9:
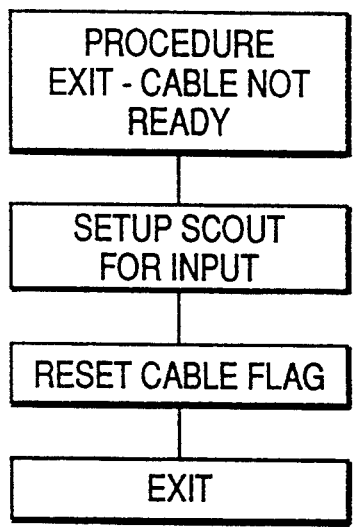
FIG. 9 is a flowchart for the exit-cable not ready procedure of the modem of the present invention.

FIG. 9 is a flowchart showing a preferred embodiment of the exit-cable not ready procedure of modem 102. The exit-cable not ready procedure provides that the SCOUT line should be set up as an input and the "cable" flag should be reset to indicate that communications have not been established with signal processing cable 100. Thus, when the procedure of FIG. 9 has been executed, the modem 102 will be placed in a mode wherein connection of the signal processing cable 100 can be attempted again, and wherein the modem 102 will operate under the assumption that only a landline telephone line is connected.

Of course, the wakeup sequence could also be initiated by a transmission from the modem 102 since the modem 102 is also capable of sensing the connection of the signal processing cable 100 to the modem 102. If this mode of operation were desired, the modem 102 would initiate the wakeup sequence upon detection of the connection by transmitting digital signals over the SCIN line at a predetermined speed known to be compatible with the signal processing cable 100, either 4800, 2400, 1200, or 300 bits per second. The initial signal transmitted by modem 102 would be 16 bits of alternating "1"s and "0"s, starting with a "1"(ground). The signal processing cable 100 would be programmed to respond to the wakeup sequence transmission from the modem 102. The signal processing cable 100 would wait eight bit periods following receipt of the 16th bit of the initial wakeup signal from modem 102. Signal processing cable 100 would then transmit the same initial signal to modem 102 on the SCOUT line. Within eight bit periods after receiving the 16th bit of the signal from signal processing cable 102, the modem 102 would then transmit a MACK signal on the SCIN line according to the protocols in Table B. Within eight bit periods after receiving the MACK signal, the signal processing cable 100 would transmit a SCACK signal on the SCOUT line according to the protocols shown in Table B to complete the wakeup sequence.

While the modem 102 has been shown in FIGS. 1, 2a and 2b as being separate from the computer, it is also possible to design a modem 102 according to the present invention that is installed internally to the computer. Such an internal modem has particular utility when used with a portable computer, such as, for example, a Zenith Supersport. When equipped internally with the modem 102 of the present invention, the Zenith Supersport computer can be plugged into a landline telephone jack to transmit over landlines. The Zenith computer with the modem 102 can also be plugged into a cellular telephone 106 by means of an appropriate signal processing cable 100 for cellular data transfer. A modem 102 designed for internal installation in a Zenith Supersport computer is shown in FIGS. 3a through 3e and 4.

The diagrams of FIGS. 3a through 3e and 4 constitute a single circuit in which labeled lines are connected to other lines bearing the same labels, although these connections have been omitted in some cases for clarity. Where connections have been omitted, a diamond-shaped device indicates a connection to another line or lines in the same FIGS. (3a through 3e or 4), while a pennant-shaped device indicates a connection to a line or lines in the other of the FIGS. 3 and 4.

The connections within FIGS. 3a through 3e are indicated by the legends in these Figures.

Figure 3A:
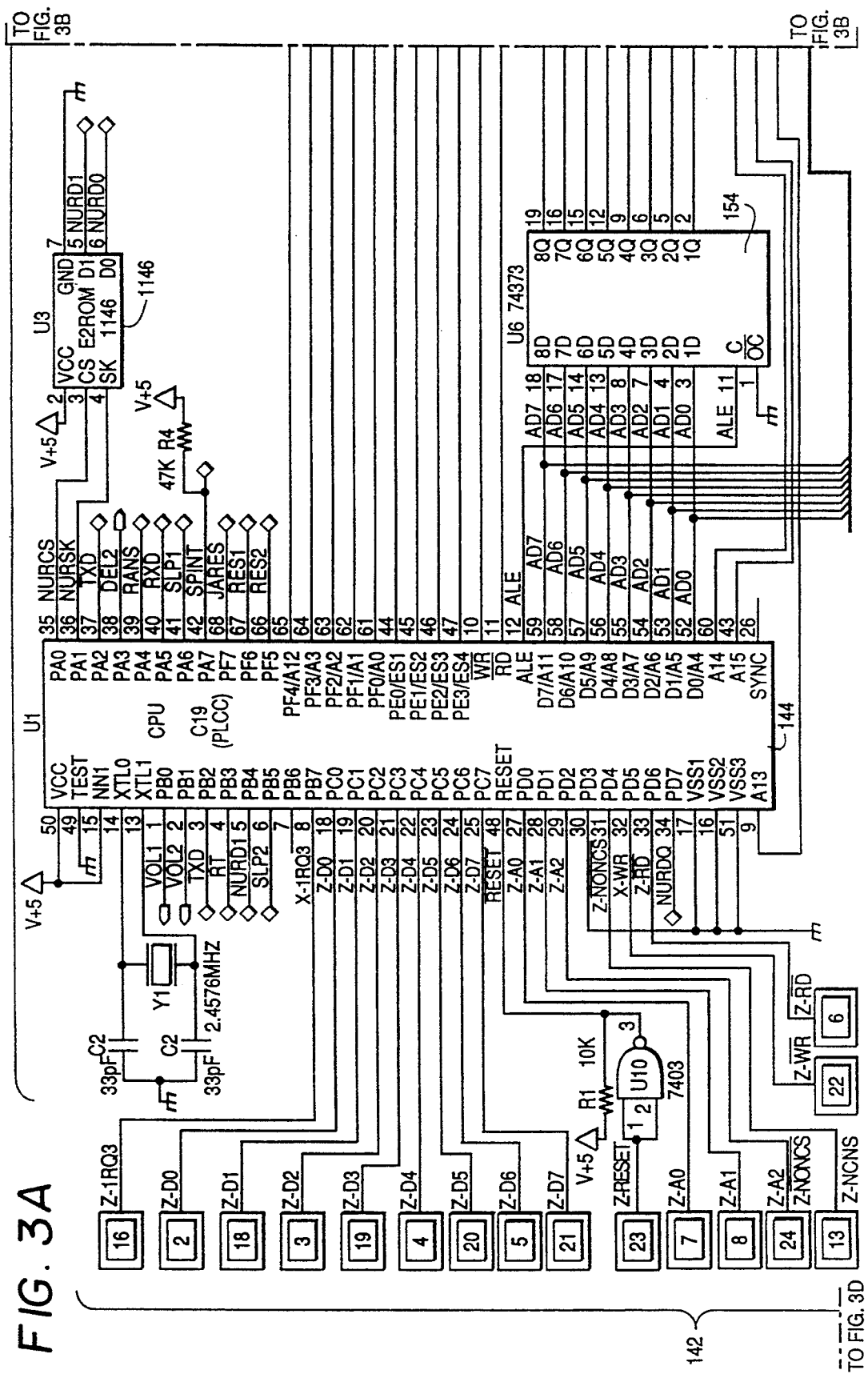

In FIGS. 3a through 3e, a schematic diagram of the CPU/modem section 114 of a modem 102 designed for internal installation in a Zenith Supersport computer is shown. The CPU/modem section 114 (and the DAA section 118 shown in FIG. 4) are preferably constructed on a circuit board designed to fit into the modem card slot of the Zenith Supersport computer. Referring now to FIG. 3a, the CPU/modem section 114 is provided with appropriate edge connections 142 for connecting to the Zenith Supersport modem connector. The functions of the lines and pins of the Zenith modem bus are as described in Service Manual Portable Computer ZWL 200-2/4 Zenith Part No. 585-295 and Technical Specifications for Internal 2400 Baud Modem Part No. 150-418, which are available from Zenith, Inc. and which are incorporated herein by reference.

The CPU/modem section 114 includes CPU 144, EEROM 146, RAM 148, ROM 150, power supply section 151, modem chip 152, and demultiplexer 154. Table D shows sample model numbers and manufacturers for the integrated circuit components. The CPU/modem section 114 also includes numerous interfacing components including capacitors, resistors, transistors, and logic gates which are connected as shown in FIGS. 3a through 3e.

TABLE D

| COMPONENT MODELS AND MANUFACTURERS | | |
|---|---|---|
| Reference # | Model | Manufacturer |
| 144 | C19 PLCC | Rockwell |
| 146 | 9346 | National Semiconductor |
| 148 | 55257 | Toshiba |
| 150 | 27512 | Toshiba |
| 152 | R6634 | Rockwell |
| 154 | 74373 | Motorola |
| 158,159 | TL072 | Texas Instruments |
| 160,161 | TL072 | Texas Instruments |
| 162 | V250LA2 | General Electric |
| 164 | LH1056E | AT&T |
| 166 | TTC-143 | Timura |
| 168 | 7403 | Motorola |

Figure 3B:
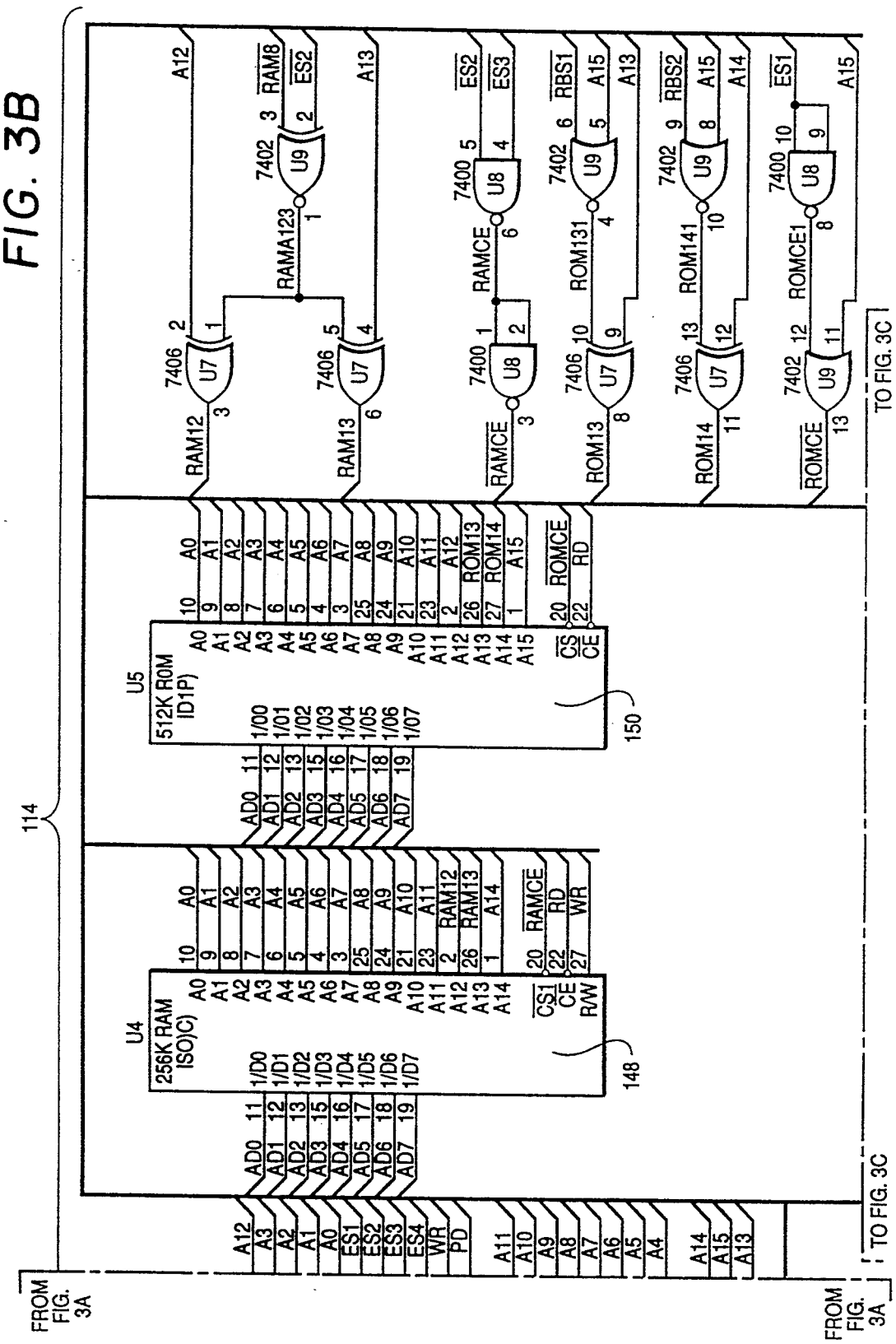

The CPU 144 controls the operation of modem 102 according to the program stored in the ROM 150 (shown in FIG. 3b). The operation of certain program procedures stored in ROM 150 will preferably be according to the flowcharts shown in FIGS. 6, 7a, 7b, 8, 9, and 10. The CPU 144 will receive data to be transmitted from the Zenith computer, and instruct the (shown in FIG. 3b) to modulate and transmit the data. The CPU will also accept data received and demodulated by the modem chip 152, transmitting this data to the Zenith computer. The software program stored in ROM 150 will preferably also implement a cellular-compatible protocol including forward error correction, variable packet sizing, and compensation for loss of carrier during cell handoffs. Such a protocol is described in the inventor's prior U.S. Pat. No. 4,697,281, the disclosure of which is incorporated herein by reference. It will also be desirable for the software program stored in ROM 150 to select different protocols depending on the conditions encountered. For example, the software may select a cellular-compatible protocol when the signal processing cable 100 is connected to the modem 102, and may select a second, more general landline compatible protocol when the modem 102 is connected to a landline telephone jack. As will be seen, the modem 102 can detect the presence of signal processing cable 100 by sensing the pullup of the SCIN line within signal processing cable 100.

The software program in ROM 150 will further cause the CPU 144 to transmit commands to the signal processing cable 100 and receive data and acknowledgement signals from the signal processing cable 100, according to the command language protocols described herein, to set up and monitor cellular calls whenever cellular data communication is requested by the Zenith Supersport computer.

Figure 6:
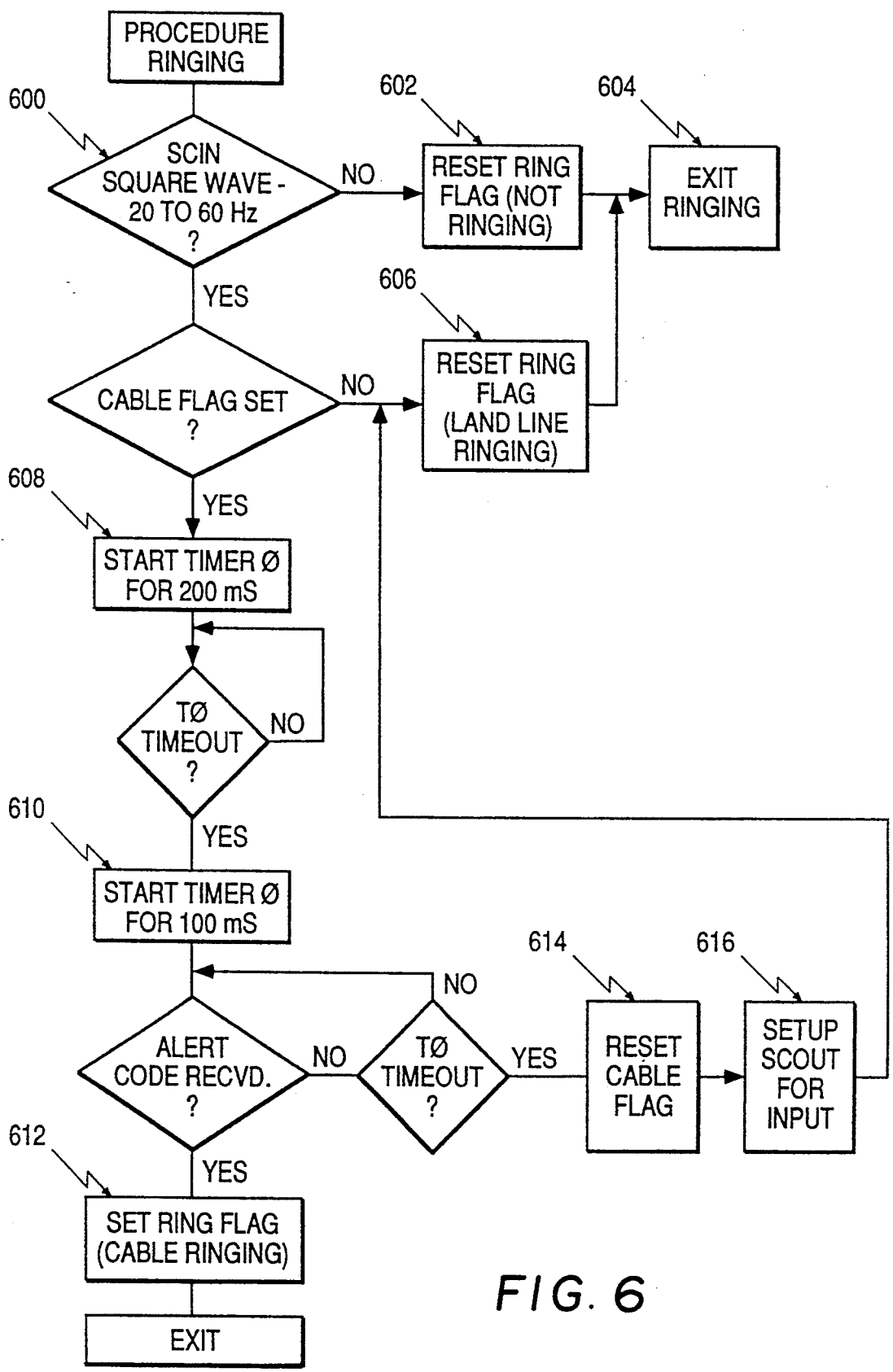
FIG. 6 is a flowchart for the ringing response procedure of the modem of the present invention.

Referring now to FIG. 6, a flowchart for a preferred software embodiment of a ringing response procedure of modem 102 is shown. When the ringing procedure becomes active, the modem 102 will monitor the SCIN line to determine whether a ringing signal is present as shown in block 600. If not, a "ring" flag which indicates that a line is ringing will be reset in block 602 and the ringing procedure will be exited in block 604. If the ringing signal is present and the "cable" flag of the memory of modem 102 is not set, indicating that a signal processing cable 100 is not connected, the "ring" flag will be set as shown in block 606 to indicate that the landline connection is ringing, and control will be returned to the standard program of modem 102 which will operate to answer the landline call. If the "cable" flag is set when a ringing signal is present, the cellular line is ringing, and control is transferred to block 608. In block 608, a timer TIMER0 of 200 ms duration is started. After the timer TIMER0 times out, the timer TIMER0 is restarted for a 100 millisecond period. If an alert code is received from the signal processing cable 100 during the period of timer TIMER0, the "ring" flag will be set to indicate that the cellular line is ringing as shown in block 612 and control will be returned to the main modem program which will answer the cellular call to provide cellular data communications. If the timer TIMER0 times out without an alert code being received by modem 102, the "cable" flag will be reset to indicate that a problem exists with the communications link between signal processing cable 100 and modem 102, as shown in block 614. The SCOUT line will be set up for input, as shown in block 616, control will be transferred to block 606, and operation will continue as though a landline call had been received.

In both the cellular and landline systems, placement of a call to another station is accomplished by dialing a telephone number. A telephone number is an "address" which identifies the telephone or other equipment to which a call is directed. The act of specifying the destination of a call to the network is referred to as "addressing" or more specifically "dialing".

Figure 8:
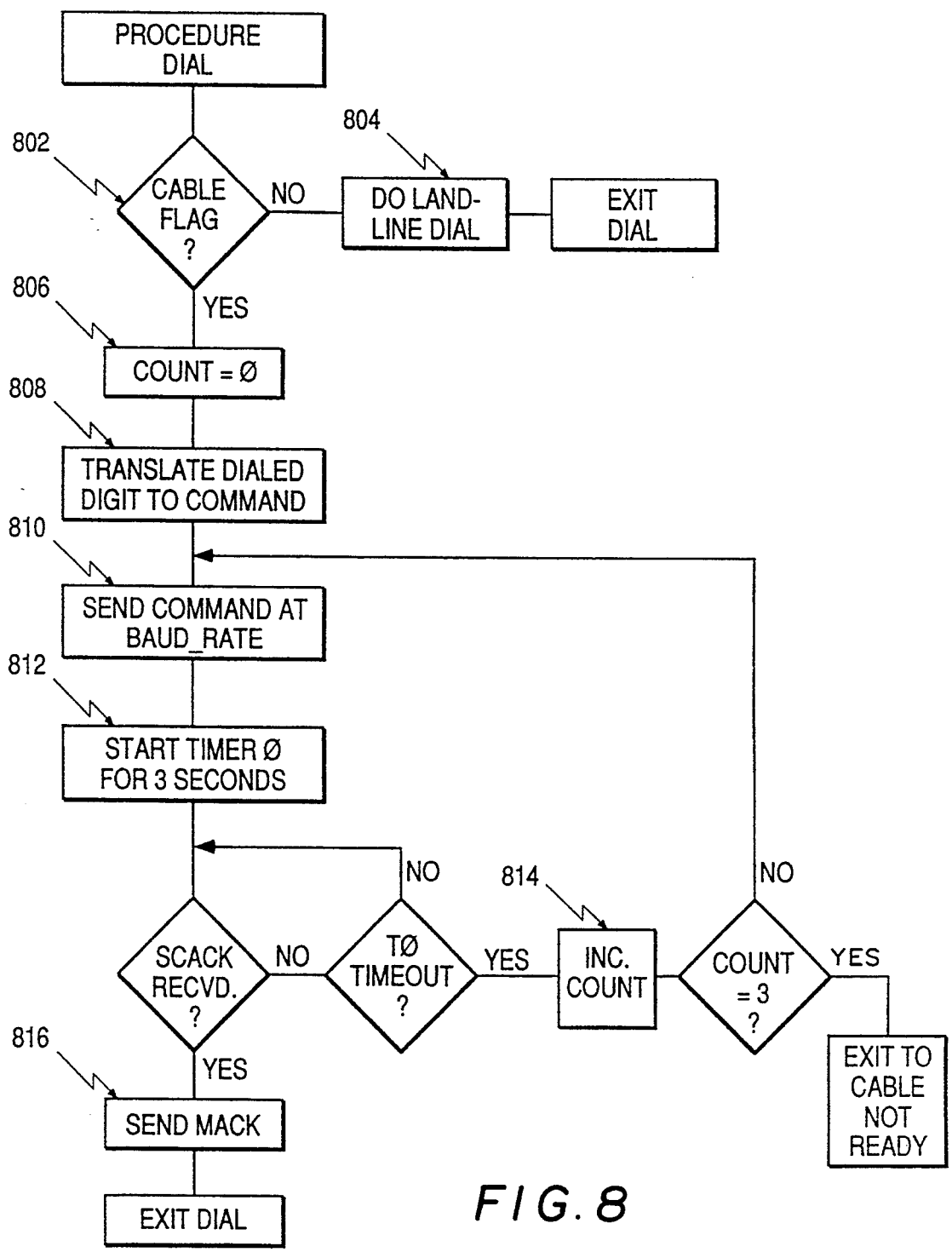
FIG. 8 is a flowchart for the dial procedure of the modem of the present invention.

FIG. 8 shows the dial procedure of modem 102. In block 802, the "cable" flag is checked to determine whether a landline or cellular line is connected. If the "cable" flag is not set, the modem 102 will commence a landline dialing sequence as shown in block 804. If the "cable" flag is set, the modem 102 will place a call using a cellular network. The COUNT variable is set to 0 in block 806. The dial procedure then translates the telephone number to be dialed (as supplied by the user or the computer connected to the modem) into a generic language command according to the command language shown in Table B, as shown in block 808. This command is transmitted to signal processing cable 100 at the appropriate baud rate stored in the memory of modem 102 as shown in block 810. A timer TIMER0 is then started for a period of three seconds as shown in block 812. If the SCACK signal has not been received by modem 102 before TIMER0 times out, the COUNT variable is incremented as shown in block 814. If the COUNT variable has reached the value of three, the modem 102 determines that communications between modem 102 and signal processing cable 100 are not functioning properly and control is transferred to the exit-cable not ready procedure as shown in FIG. 9. As long as the COUNT variable has not reached three, control will be passed back to block 810 for retransmission of the generic command. When the command has been transmitted successfully and SCACK has been received, the MACK command will be transmitted by modem 102 as shown in block 816.

Figure 10:
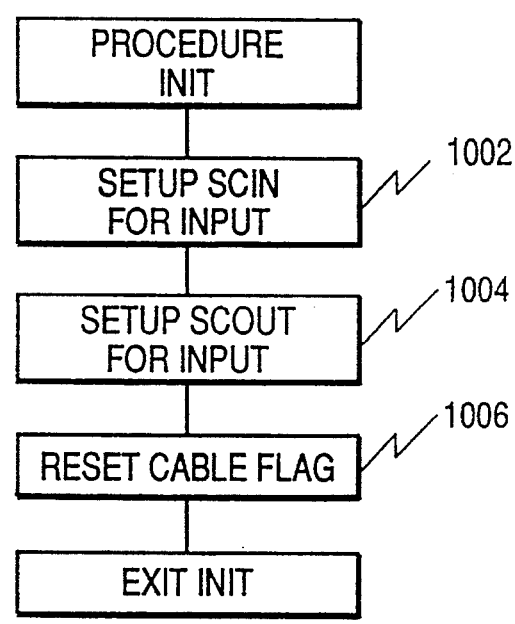
FIG. 10 is a flowchart for the initialization procedure of the modem of the present invention.

In FIG. 10, the initialization procedure for modem 102 is shown in flowchart form. This procedure is executed whenever modem 102 is reset, as at powerup, and may be executed in response to a software reset or a reset command from an attached computer. First, the SCIN line is set up for input as shown in block 1002. Next, the SCOUT line is set up for input as shown in block 1004. Next, the "cable" flag is reset to indicate that communications have not been established with signal processing cable 100, as shown in block 1006. Although other functions might be performed at initialization, this completes a preferred initialization procedure.

Referring now to FIG. 3e, the RJ-11 connector 140 of modem 102 is shown. The lines of this connector are connected according to the description in Table A. However, since the modem 102 will draw its power from the Zenith Supersport computer rather than from the cellular telephone 106, the BAT line of the RJ-11 connector 140 is not connected within the modem 102. In the embodiment shown in FIGS. 3a through 3e, the modem 102 is provided with a second RJ-11 connector 156. The second RJ-11 connector 156 is connected only to the TIP and RING lines of the modem 102, so that the second RJ-11 connector 156 can be used only with landline telephones. Of course, it is also possible to provide only a single RJ-11 connector 140 which can be used either with landline telephones or, with the proper signal processing cable, with cellular telephones. If a single connector is used, it would be possible to isolate the SCIN and SCOUT lines of the modem 102 whenever the modem 102 is not being used with a signal processing cable 100. Isolation of the SCIN and SCOUT lines would prevent damage to the modem 102 in case the second and fifth pins of the landline telephone cable are being used to carry landline telephone signals. Any of a number of protective circuits or switching devices, such as a simple toggle switch, could be used to limit incoming signal power on the SCIN and SCOUT lines or to disconnect these lines from the components of modem 102 when the modem 102 is used with a landline connection.

The power supply section 151 shown in FIG. 3d operates to control power to the CPU/modem section 114 and the DAA section 118. The SLP1 and SLP2 signals are generated by microprocessor 144 and are selective asserted by microprocessor 144, causing the relay 153 to enable and disable power to sections of the circuit of modem 102.

Figure 3C:
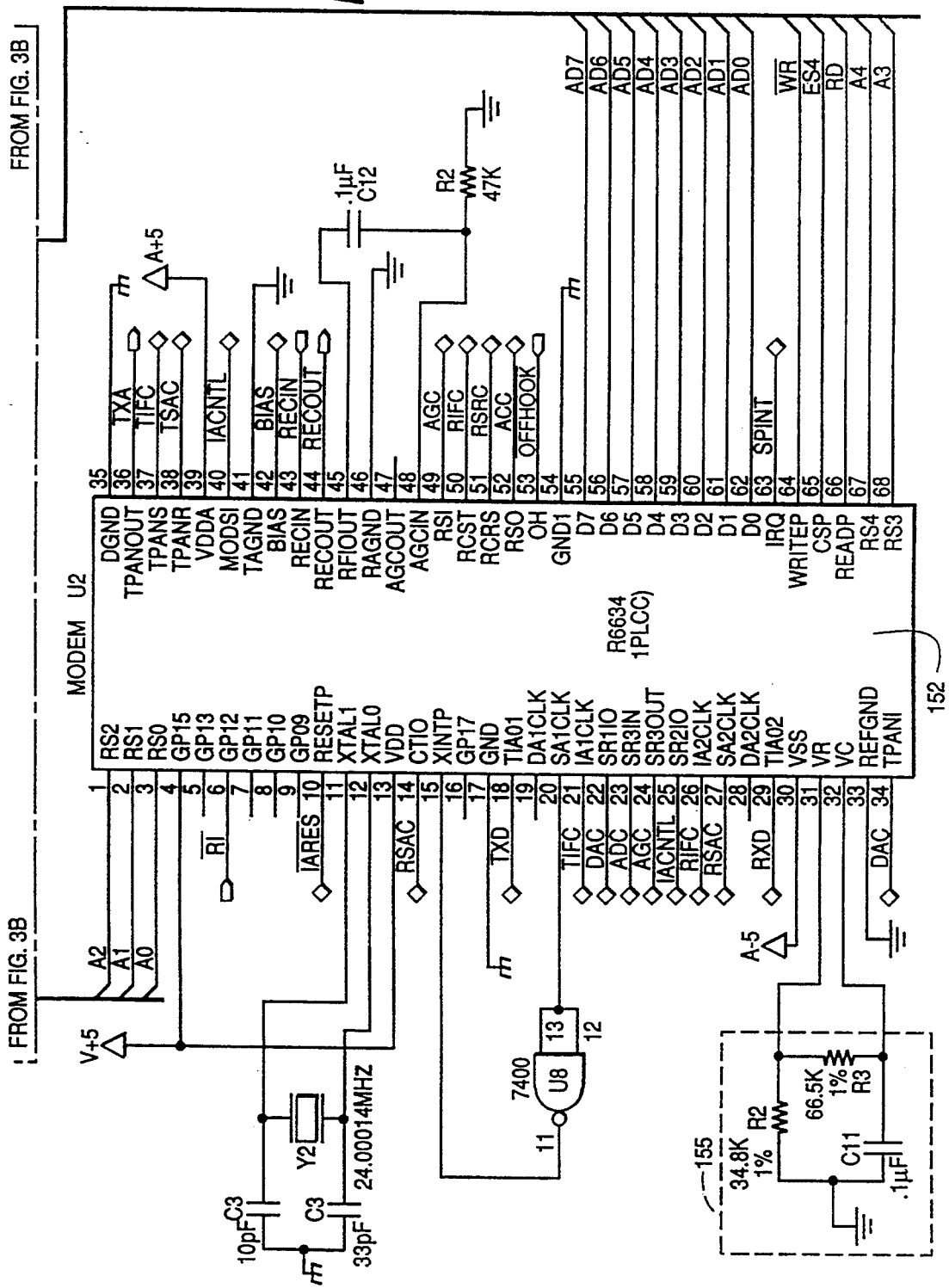

Referring to FIG. 3c, the modem chip 152 is a combination digital signal processor and analog front end (A/D and D/A converter). The modem chip 152 is provided with its own 24.00014 Mhz frequency crystal to enable timing functions for digital signal processing. The modem chip 152 is also provided with a bias section 155 which provides a bias voltage used in the analog front end functions of modem chip 152.

The OR, AND, and NOR gates labeled U7, U8, and U9 respectively and shown in FIGS. 3b and 3c are used in address decoding and memory bank swapping. Since the CPU 144 can directly address only 64K of memory, and substantial excess memory is used in the system, a memory bank swapping scheme is necessary for proper system operation.

Figure 4:
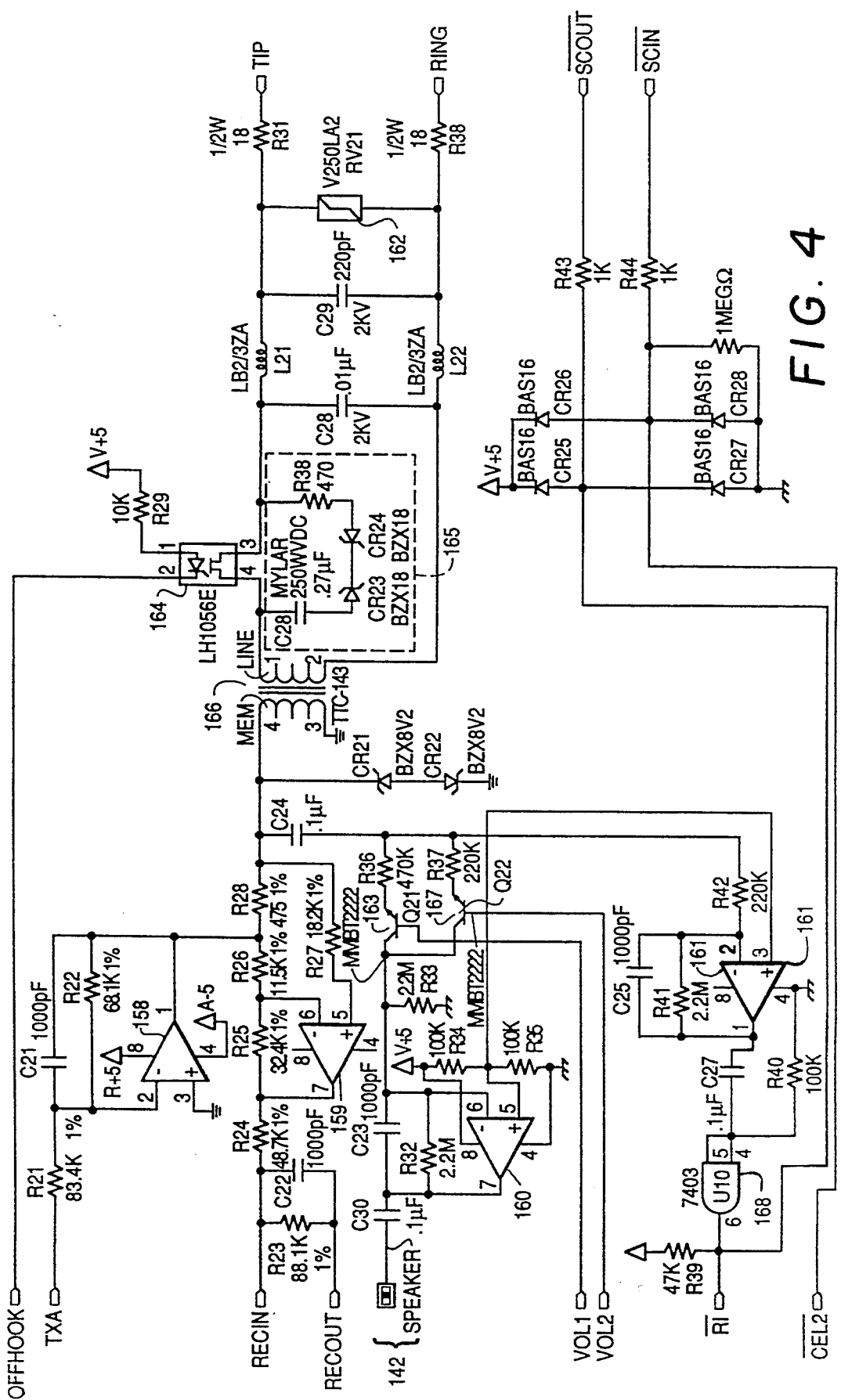
FIG. 4 is a schematic diagram of a preferred embodiment of the Data Access Arrangement section of the cellular data modem of the present invention.

Referring now to FIG. 4, the DAA section 118 of the modem 102 is shown in detail. DAA section 118 includes operational amplifiers 158, 159, 160, and 161, varistor 162, isolated FET switch 164, bypass network 165, isolation transformer 166, NAND gate 168, and resistance switching transistors 163 and 167. Exemplary model numbers and manufacturers for major components are shown in Table D. In addition, DAA section 118 includes numerous resistors, capacitors, and diodes with values as indicated in FIG. 4. The transistors shown in FIGS. 3d and 4 may be 2N2222 transistors manufactured by Motorola.

The DAA section 118 provides isolation and interfacing circuitry for connecting the CPU/modem section 114 to the analog TIP and RING lines. In addition, the DAA section 118 provides appropriate pullup, pulldown, and protective circuitry for the SCIN and SCOUT lines. The SCOUT and SCIN terminals of the modem 102 are open collector. A logic "1" is represented by ground, and a "0" is represented by Vcc, which is 5 volts DC. The DAA section 118 provides a pullup for the SCOUT terminal to hold it at a logic "0" unless it is driven by the signal processing cable 100. As will be seen, the signal processing cable 100 includes a 47 kOhm pullup resistor connected between its SCIN terminal and Vcc to hold the SCIN terminal at a logic "0" unless the line is driven by the modem 102.

The isolation transformer 166 provides FCC part 68 protection for the circuit. The isolated FET switch 164 responds to the OFFHOOK signal to take the modem 102 on and off hook. The bypass network 165 provides snubbing and allows ring voltage to be transmitted at an attenuated level to the CPU/modem section 114 even when the isolated FET switch 164 is open (on hook).

The operational amplifiers 158 and 159 are preferably contained in a single monolithic device. Similarly, the operational amplifiers 160 and 161 may be contained in a single device. Operational amplifier 161, with its associated circuitry, senses ring voltage from the tip and ring lines and selectively produces a ring indication signal RI. Operational amplifier 158 is a transmission signal amplifier. The capacitor C21 and resistor R22 associated with operational amplifier 158 provide high frequency filtering of the transmission signal. The operational amplifier 159 is an input signal amplifier stage and summer. Operational amplifier 159 acts to separate the output signal from the total TIP and RING signals so that the input signal can be passed to CPU/modem section 114.

The operational amplifier 160 acts as a volume controlled speaker amplifier. The resistance switching transistors 163 and 167 respond to the VOL1 and VOL2 signals generated by CPU/modem section 114 to connect either a 470K Ohm resistor, a 220K Ohm resistor, or both these resistors in parallel between the speaker signal and the speaker. Thus, four possible volume levels corresponding to the digital level permutations of VOL1 and VOL2 are possible.

While the schematic diagrams of FIGS. 3a through 3e and 4 show a system designed to interface with a Zenith Supersport computer, those skilled in the art will recognize that the modem 102 of the present invention could be readily adapted for installation in other types and brands of portable computers and other computing devices in general.

Figure 5:
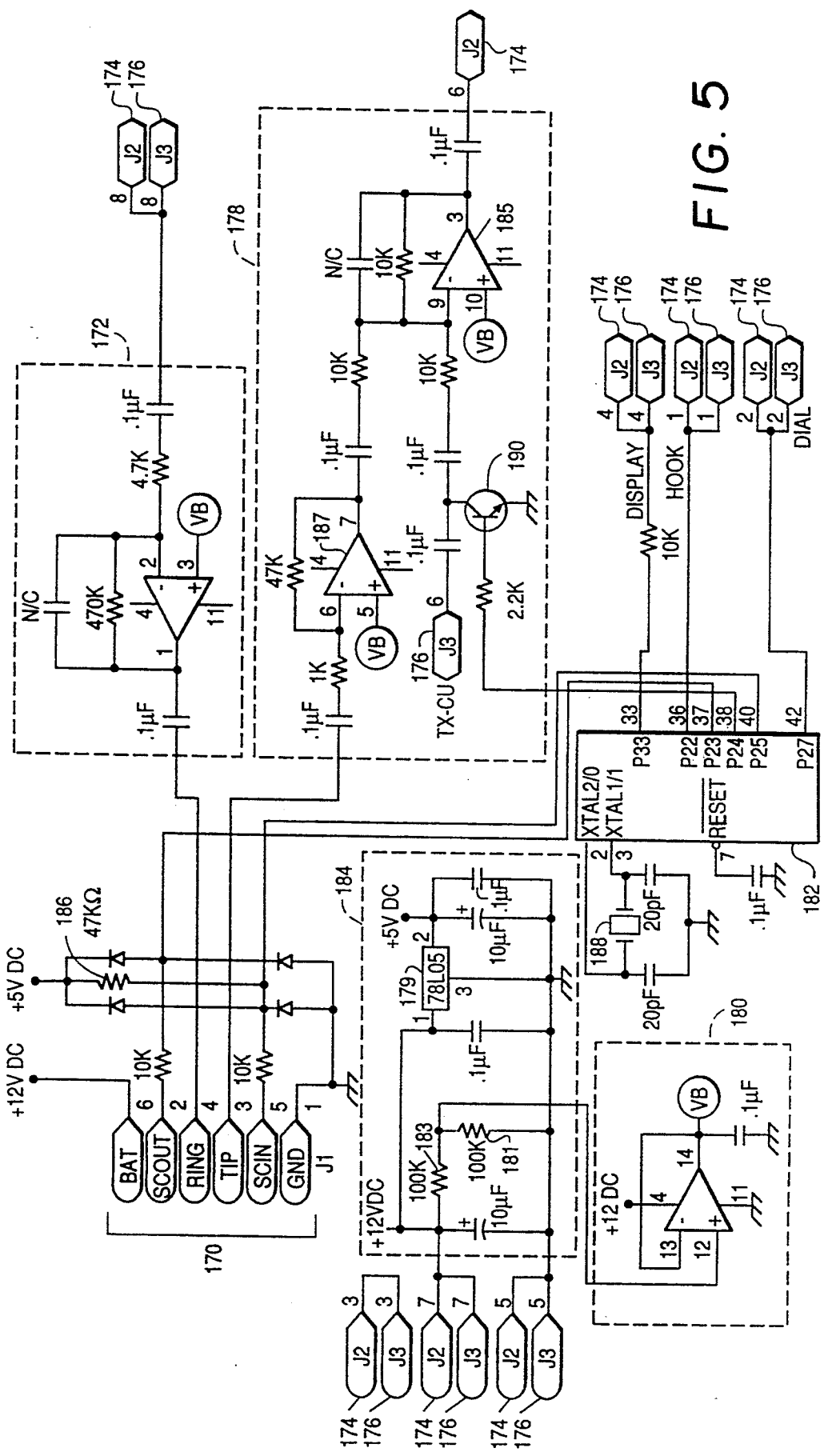
FIG. 5 is a schematic diagram of a signal processing cable according to the present invention.

A preferred embodiment of the signal processing cable 100 is shown in FIG. 5. The signal processing cable shown in FIG. 5 is designed to operate with the modem 102 shown in FIGS. 3 and 4 and with a Fujitsu Commander cellular telephone. Of course, those skilled in the art can readily construct signal processing cables in accordance with the present invention to operate with other brands and models of cellular telephones. It is a particular advantage of the present scheme for connecting computers to cellular and landline telephone networks that the signal processing cables are relatively simple and low in cost. As new cellular telephone models and brands are introduced, the design shown in FIG. 5 or a similar design can be adapted for use with these other telephones through simple wiring, connector, and software modifications. The functions and connections of the cellular bus lines in the Fujitsu Commander telephone are described in the "Fujitsu Commander Cellular Mobile Telephone Installation and Maintenance Manual," available from Fujitsu America, Inc., Richardson, Texas, which is incorporated herein by reference.

Referring now to FIG. 5, the signal processing cable 100 includes an RJ-11 connector 170 (also labeled J1), ring interface section 172, tip interface section 178, cellular bus connectors 174 and 176 (also labeled J2 and J3 respectively), bias voltage section 180, microcontroller 182, and power supply section 184.

The signal processing cable 100 includes numerous resistors and capacitors which have the values shown in the diagram. The capacitors marked N/C (for "No Connect") are optional filtering capacitors. If included in the circuit, these capacitors may take on any desired value appropriate for filtering unwanted signals. The signal processing cable 100 also includes transistor 190, which may be a Motorola 2N2222 transistor. The diodes shown in FIG. 5 may be 1N914 diodes manufactured by Motorola.

The RJ-11 connector 170 is mounted on the end of a modular telephone wire of appropriate length and is adapted to connect to the RJ-11 connector 140 of modem 102 (as shown in FIG. 2a).

The cellular bus connectors 174 and 176 are RJ-45 connectors as manufactured by Amphenol, and are mounted on wires of appropriate length for connection to the cellular transceiver 110 and control unit 108. Rather than connecting to the cellular bus 112 using a three-way connector as shown in FIG. 2a, which would merely connect all the equivalent lines of the three cables, this preferred embodiment of the invention provides two cables at the cellular telephone side of signal processing cable 100. One of these cables, terminating in cellular bus connector 174, is connected to cellular transceiver 110. The other cable, terminating in cellular bus connector 176, is connected to cellular control unit 108. Thus, the cellular bus 112 passes through the signal processing cable 100. This embodiment is preferred because the number of connections and wires required is reduced and because this arrangment allows the signal processing cable to selectively block signals transmitted on cellular bus 112 by control unit 108 or transceiver 110 as well as injecting signals into the cellular bus 112.

The microcontroller may be a Zilog Z8 PLCC surface mount microcontroller, model Z86C08 which includes a microprocessor, RAM, input/output ports, and a mask-programmed ROM program memory. The program memory of the microcontroller 182 will be masked to contain a program implementing the functions of the signal processing cable 100 which have been described herein. The source code for this program may be as shown in Appendix A. The microcontroller 182 is provided with a crystal 188 which may be a 3.6864 Mhz crystal.

The power supply section 184 includes a 5 V DC power supply regulator 179, which may be a 78L05, and various filter capacitors as shown in the drawing. The voltage divider resistors 181 and 183 are connected between 12 V DC and ground, so that a voltage of approximately 6 V DC is produced at the connection of voltage divider resistor 181 to voltage divider resistor 183.

The four operational amplifiers shown in ring interface section 172, tip interface section 178, and interface section 180 are preferably contained in a monolithic TL074 integrated circuit manufactured by Texas Instruments. Pin numbers for the connections to this circuit are indicated in FIG. 5. The operational amplifiers operate with a bias voltage VB generated by the bias voltage section 180 from the 6 V DC voltage provided at the common terminal of the two 100K Ohm voltage divider resistors 181 and 183 of power supply section 184. The connection of pins of the operational amplifier circuit to the circles designated VB (pins 3, 5, 10, and 14) indicates an electrical connection between these pins, although the lines for these connections have been omitted from FIG. 5 for clarity.

The ring interface section 172 provides level and impedance matching for the RING line to make the RX signal of the Fujitsu cellular transceiver compatible with the RING analog terminal of modem 102. Similarly, the operational amplifier 187 of ring interface section 172 provides impedance and level matching for the TIP line to make the TIP signals of the modem 102 and the TX signal of the Fujitsu cellular transceiver compatible.

Tip interface section 174 further includes a summing operational amplifier 185 which sums the tip signals and the signals produced by the microphone of cellular control unit 108. Tip interface section 174 also includes a switching transistor 190. The base of switching transistor 190 is connected through a resistor to the P25 terminal (pin 40) of the microcontroller 182. By controlling the output of its P25 terminal, the microcontroller 182 can selectively ground the line connected to the collector of the switching transistor 190 to selectively inhibit or permit the transmission of signals from the cellular control unit microphone (which is connected to pin 6 of cellular bus connector 176) to cellular bus connector 174.

The microcontroller 182 is connected by its P22 terminal input/output port (pin 36) to the Hook lines of the cellular bus 112. The microcontroller 182 can thus selectively control the voltage on the Hook lines of cellular bus 112. Similarly, the P27 terminal (pin 42) of the microcontroller 182 is connected to the dial lines of the cellular bus 112. The microcontroller 182 can therefore selectively control the voltage on the dial lines of cellular bus 112 by varying the signal from the P27 terminal to the dial lines.

In another embodiment of the signal processing cable 100, the signal processing cable 100 may be designed to operate with more than one type of cellular bus. Multiple-bus compatibility would be particularly desirable where several types of cellular busses use the same connectors and use relatively similar signalling lines within their busses. The masked ROM of the microcontroller 182 provides enough memory capacity to store operating information for several types of cellular busses. Other than the additional operating software required, all that is required to produce a signal processing cable 100 compatible with a plurality of types of cellular busses is to provide an input signal specifying the type of bus. In the simplest embodiment, this input signal could be one or more DIP switches, jumper lines, or switches mounted on the exterior of the circuit casing of signal processing cable 100 and connected to an input of microcontroller 182. These switches or jumpers would be adjusted by the end user to define the type of cellular bus 112 connected to signal processing cable 100, and the program of microcontroller 182 would respond to these switch or jumper signals to select appropriate protocols or appropriate transmission lines of the cellular bus 112 to be used. In another embodiment of the multiple-bus compatible signal processing cable, input ports of the microcontroller 182 may be connected to lines of the cellular bus 112 and the microcontroller 182 is programmed to sense signals on the lines of the cellular bus 112 to identify the configuration of the cellular bus 112. The program of microcontroller 182 would then select appropriate protocols and lines for transmission of signals to and reception of signals from the particular type of cellular bus 112.

While the multiple-bus embodiment of the signal interface cable 100 has been described in terms of cellular busses that use similar connectors, it would also be possible to design such a multiple-bus cable to be compatible with a plurality of busses using dissimilar connectors. In this embodiment, the signal processing cable 100 would be provided with a plurality of cables for connecting to the cellular bus 112 or for connecting to the cellular control unit 108 and the cellular transceiver 110, and the user would select the cables to be connected or would select from among plug adapters provided for adaptation of the cables to dissimilar connection systems.

The SCIN line, pin 2 of the RJ-11 connector 170, is connected to +5 volts DC by pullup resistor 186, which is a 47 kOhm resistor.

The command codes and responses will be transmitted between the modem 102 and signal processing cable 100 over SCIN and SCOUT, as appropriate, at a speed of 4800, 2400, 1200, or 300 bits per second. The speed of transmission will be determined by the maximum speed capability of the signal processing cable 100, which will be communicated to the modem 102 during the wakeup sequence, which was explained in detail previously. The signal processing cable 100 is preferably designed to have the lowest cost components and lowest power consumption consistent with its mission of communicating with the cellular telephone bus 112. Thus, although the signal processing cable 100 could be designed to operate at much higher speeds, in the interests of reducing cost and power consumption, speeds of 4800 baud or less are preferred.

In general, additional forms of signal limiting protection, as are well-known in the art, may be included in the system to minimize the possibility of damage to the circuits of the present invention by transmission of high voltage or current signals through the various information transfer line connections. To the extent possible, in order to minimize the cost of the signal processing cable 100, any additional desired signal limiting protection for information transfer terminals will preferably be provided within modem 102 rather than in signal processing cable 100.

Each byte of data is preferably sent as eight bits, with one start bit (logic "1" or ground) and two stop bits, for a total of 11 bits per word sent. As a particular feature of the invention, each byte sent will be repeated three times, allowing for majority decoding. The bits are repeated without the insertion of additional stop bits, so that one byte of data can be sent as 33 bits presented serially in 33 bit times.

Exceptions to this method of data transmission on the SCIN and SCOUT lines occur during the wakeup sequence and the alert sequence, as described previously.

STATEMENT OF INDUSTRIAL APPLICABILITY

Broadly, the present invention relates to the field of digital data transmission systems. More specifically, the present invention is an integrated modem and interfacing system that permits connection of a single cellular-capable modem to a variety of cellular transceivers or to a landline telephone jack.

```
.syntax 1900
.fillchar 0ffh
.comment
                    FUJITSU CABLE
            OEM INTELIJAK for POWERTEK and FUJISTU
        5/31/90 - copyright  SPECTRUM INFORMATION TECHNOLOGIES use Z86C08 microcontroller
clock rate 3.6864 MHz
ROM use internal 2K (masked, otp)
RAM use GP registers (up to 127)
use port 3 in comparator mode

P00 - O -
P01 - O -
P02 - O -

P20 - O -
P21 - O -
P22 - O - CP - hook assert (high = on hook)
P23 - O - SCOUT (Serial data to modem, 1 = GND  0 = +5v)
P24 - O - Dial data output (sent to TRU)
P25 - I - SCIN (Serial data to cable from modem)
P26 - O -
P27 - I - Dial assert P31 - I -
P32 - I -
P33 - I - CP Display sense T0 - 20 msec real time clock (58x180)

.GLOBALS ON

P0:             .reg    mr0             ;p0 pointer
P2:             .reg    mr2             ;p1 pointer
P3:             .reg    mr3             ;p2 pointer ; registers 070h to 07fh disp.reg:       .reg    mr16    ; display register for status info
alert.flag:     .reg    mr17    ; flag set when call in - DO for 07xh flag
mod.command:    .reg    mr19    ; register containing RXD command from modem
sc.command:     .reg    mr20    ; register containing command to send to modem
data.reg1:      .reg    mr21    ; register for testing cp.ring.start
data.reg2:      .reg    mr22    ; register for testing cp.ring.end
twosec.flag:    .reg    mr23    ; flag for checking if two sec are over reg.RTC:        .reg    mr126           ; .020 second clock adr.RTC:        equ     126
adr.RTC.lo:     equ     adr.RTC+1
adr.RTC.hi:     equ     adr.RTC cp.send:        equ     13              ;cellular phone dial commands
cp.end:         equ     14
cp.clr:         equ     17
cp.stor:        equ     18
cp.recl:        equ     19
cp.f:           equ     20
cp.mute:        equ     21
cp.up:          equ     22
cp.down:        equ     23
cp.onhook:      equ     010h
cp.offhook:     equ     000h
cp.ring.start:  equ     0a0h
cp.ring.end:    equ     0b0h
cp.ring.cont:   equ     07fh ; register 060h to 06fh for the stack irq0:           defv    q0.int
irq1:           defv    q0.int
irq2:           defv    q0.int
```

```
irq3:           defw    q0.int
irq4:           defw    t0.int          ; RTC, possible other uses
irq5:           defw    q0.int
;
        org     c00ch
start:  jr      reset.table
;
;       this table allows many different start points to be used.
;       the JP ALWAYS opcode is 8D.  The JP NEVER opcode is 0D.
;       therefor, to remove the opcode from activity, blow the
;       8D to a 0D. This may allow many code changes from the
;       same OTP part. The valid program code area is from
;       00280h to 01ffh. Locations 00C0 to 0280 are for interrupts,
;       program start locations, and this jump table.
;
;
reset.table:
        jp      init00                  ; 1; use first (this rom)
;
        org     01cfh
q0.int: nop
;
        org     01fh
t0.int:
        incw    reg.RTC                 ; inc RTC location
        iret
;
; align with end of internal rom ....

org     0300h
;
;
init00:
        di
        srp     0f0h
        ld      r6,063h                 ; p2m; 0110 0011
        ld      r7,000h                 ; p3m digital, port2 pullups active
        ld      r8,004h                 ; p01m; p00-p02 as outputs
        ld      r9,003h                 ; ipr
        ld      r5,0e9h                 ; pre0 58, continuous
        ld      r4,0a0h                 ; t0 count for 20msec interrupt
        ld      r11,090h                ; imr enable t0 ints
        ld      r1,003h                 ; tmr
        srp     0c0h                    ; working registers = c
        ld      r0,080h
        ld      r2,014h                 ; dtmf set,tone off,cp-dial open,on hook
        ld      spl,070h                ;set stack pointer
        ld      sph,000h
        ei
        ld      r7,adr.RTC.hi           ; high
        ld      r8,adr.RTC.lo           ; low
        clr     alert.flag
        clr     twosec.flag
        call    wakeup.seq
;
main.10:
        clr     r15
        clr     data.reg1
        clr     data.reg2
        clr     mod.command
        tm      r3,008h                 ; if CC data then get it
        jr      nz,alert?
        call    get.cp
        ld      disp.reg,r15
        and     r15,0f0h
        cp      r15,cp.ring.start
        jr      nz,alert?
        ld      twosec.flag,001h        ; initialize twosec flag
        ld      alert.flag,003h         ; new - alert and 07xh flag on
alert?: cp      alert.flag,003h         ; old alert?
        jr      nz,scin?
        cp      twosec.flag,001h        ; 2 sec over?
        jr      nz,scin?
n.ring.10:
        call    rj.ring
```

```
            clr     twosec.flag             ; reset 2 sec over flag
            and     alert.flag,002h         ; reset 07x flag
            ld      r10,12                  ; wait for 240 msec
            add     r10,(r8)
r.wt0:      tm      r3,008h                 ; while waiting, if CU data, get it
            jr      nz,r.wt1
            call    get.cp
            ld      data.reg2,r15
            and     data.reg2,0f0h          ; store if ring end came
            and     r15,070h                ; watch for 07x data
            jr      z,r.wt1
            ld      alert.flag,003h
r.wt1:      cp      r10,(r8)
            jr      nz,r.wt0
            ld      r10,88                  ; wait for 2 sec
            add     r10,(r8)
            ld      sc.command,055h         ; send alert to modem
            call    send.command
scin?:      tm      r2,020h                 ; scin low?
            jr      nz,disp?
            call    get.command
            ld      mod.command,r15
disp?:      tm      r3,008h                 ; if cu data get it
            jr      nz,rend?
            call    get.cp
            ld      data.reg2,r15
            and     data.reg2,0f0h          ; watch for ring ending
            and     r15,070h                ; watch for 07x data
            jr      z,rend?
            ld      alert.flag,003h         ; set 07x data
rend?:      cp      data.reg2,cp.ring.end
            jp      nz,twos?
            clr     alert.flag              ; clear alert and 07x flag
twos?:      cp      r10,(r8)
            jr      nz,com?
            ld      twosec.flag,001h        ;
            tm      alert.flag,001h         ; 07x data received?
            jr      nz,com?
            clr     alert.flag              ; clear alert and 07x flags
com?:       cp      mod.command,00bh        ; was a SEND received?
            jr      z,do.cl
            cp      mod.command,01ch        ; was a CR received?
            jr      z,do.cl
            cp      mod.command,012h        ; was command take.cp off hook?
            jr      nz,do.command
do.cl:      clr     alert.flag              ; clear alert and 07x flag
do.command:
            jp      main.10

;

.COMMENT get.cp - gets the fujitsu cellular phone TRU to CU information.
            Info found is returned in R15. This routine is called
            some unkown time after the start bit is sent. If
            called more then 7/8 of a bit time after the start bit
            then value returned will not be accurate.

do:
            call    get.cp
            jr      do srp     000
            r2  - P2 (contains data to get)
            r12 - for loop counter
            r13 - temp storage
            r14 - dcp.clk loop counter
            r15 - dialable digit get.cp:
            ld      r12,8                   ;8 bits to collect
;           clr     tmr
gcp.10:     call    dcp.clk                 ;wait the clock time
```

```
        ld      r13,r3          ;get the bit
        swap    r13             ;bit in MSB
        rlc     r13             ;carry has the bit
        rlc     r15             ;r15 has the bit
        djnz    r12,gcp.10
;       ld      tmr,003h        ; restart t0 ints
        ret
;
.COMMENT rj.ring - places a 25 Hz square wave on SCOUT do:     call    rj.ring         ;call the ringing srp     000
        r2 - for placing 25 Hz on SCOUT
        r8 - pointer to LSByte of RTC
        r11 - duration timer
        r12 - loop counter
        r13 - loop counter rj.ring:
        di
        srp     0f0h
        ld      r7,001h
        srp     000h
        ei
        ld      tmr,003h        ; load and start clock
        ld      r12,50          ; .020 by 50 = 1 sec
        ld      r11,(r8)
rjr.1:  inc     r11
rjr.2:  cp      r11,(r8)
        jr      z,rjr.2         ; wait 20 msec
        xor     r2,008h         ; change level of SCOUT
        ld      r14,12
rjr.3:  clr     r13             ; a small wait
rjr.4:  djnz    r13,rjr.4
        djnz    r14,rjr.3
        djnz    r12,rjr.1
rjr.5:
        di
        srp     0f0h
        clr     r7
        srp     000h
        ei
        ret ;
.comment
        wakeup.seq - The cable at a chosen speed (4800,2400, 1200
or 300 bps) (default = 1200 bps) will present 16 bits of alternating 1
and 0, starting with 1 (ground). The modem will wait 8 bit periods
from the last (16th) bit, then send 16 bits alternating 1 and 0, starting
with 1. Within 8 bit periods after receiving the 16th bit, the cable
will SCACK. Within 8 bit periods of receiving SCACK the modem
will send MACK. If this sequence fails at any point the modem will do
nothing untill the next wakeup sequence is started by the cable.
        do:     call    wakeup.seq
                jr      do srp     000
        r2      -P2 (for sending wakeup sequence commands on SCOUT
                    and for receiving commands on SCIN)
        r12     - counter for 8 or 16 bits wakeup.seq:
        ld      r12,8
wup.10: and     r2,0f7h         ; 16 bits of alternating 1 and 0
        call    w.bit           ; start with 1 (ground) on SCOUT
        or      r2,008h         ; wait 1 bit period (0.8334 msec)
        call    w.bit           ; next 0 (+5v) on SCOUT
        djnz    r12,wup.10
        ld      r12,8           ; modem waits for 8 bit periods from las
wup.20: call    w.bit
```

```
                djnz    r12,wup.20
                ld      r12,8
wup.30: tm      r2,020h                         ; modem to send 16 bits of 1 and 0
                jr      nz,start                ; test SCIN for low
                call    v.bit                   ; invalid sequence - exit
                tm      r2,020h                 ; test SCIN for high
                jr      z,start                 ; invalid sequence
                call    v.bit
                djnz    r12,wup.30
                ld      r12,8                   ; waits 8 bit periods from last bit
wup.40: call    v.bit
                djnz    r12,wup.40
                ld      r12,8
wup.50: and     r2,0f7h                         ; send SCACK (00h)
                call    v.bit
                djnz    r12,wup.50
                ld      r12,8                   ; modem waits for 8 bit periods
wup.60: call    v.bit
                djnz    r12,wup.60
                ld      r12,4                   ; get MACK lower nibble (F)
wup.70: tm      r2,020h                         ; test SCIN for high
                jr      z,start                 ; invalid sequence
                call    v.bit
                djnz    r12,wup.70
                ld      r12,4                   ; get MACK higher nibble (0)
wup.80: tm      r2,020h                         ; test SCIN for low
                jr      nz,start                ; invalid sequence
                call    v.bit
                djnz    r12,wup.80
                ret .comment
        Wait routines that waits in multiples of 0.0521 msec (which is for 19200 bps
                Speed           bit period
                19200           0.0521 msec
                 9600           0.1042 msec
                 4800           0.2083 msec
                 2400           0.4167 msec
                 1200           0.8334 msec
                  300           3.3333 msec v.bit:  ld      r10,1
wt.b2:  call    vt.bt
                djnz    r10,wt.b2
                ret
wt.bt:  ld      r11,50h                         ; default bit period = 0.8334 ms
b.t1:   nop
                djnz    r11,b.t1
                ret
;

.COMMENT
        dial.cp - dials the fujitsu cellular phone. Number to dial
                is in R15 (ie if 1 to dial then r15=001). Waits prior
                to dialing the digit, which handles the inter-digit
                delay.
        do:
                call    dial.cp
                jr      do
        srp     000
        r2 - P2 (for dialing)
        r4 - mask value 001
        r10 - mask value 0feh
        r12 - for loop counter
        r13 - temorary storage
        r14 - dcp.clk loop counter
        r15 - dialable digit dial.cp:
                push    r15
                call    dcp.0
                pop     r15
                cp      r15,cp.clr
```

```
            jr      nz,dcp.01
            ld      r9,20               ;wait 20 counts if clear key
dcp.01:
            clr     r15
;           fall through
dcp.0:
            com     r15                 ;compliment r15
            ld      r10,07fh
            ld      r13,r2              ;7654 3210 - from P2
            ld      r12,8               ;8 bits to send
            and     r2,r10              ;set the start bit - L654 3210
dcp.30:     call    dcp.clk             ;wait the clock time
            rlc     r13                 ;6543 210c - from P2
            rlc     r15                 ;carry has bit
            rrc     r13                 ;c654 3210
            ld      r2,r13              ;out the port
            djnz    r12,dcp.30
            call    dcp.clk             ;final clock
dcp.ret:
            or      r2,080h             ;raise the port as necessary
            ret
dcp.clk:                                ;call this with 20 cycles
            ld      r14,0b0h                ;6 cycles
dcp.cl0:
            nop                         ;192x6=1152
            djnz    r14,dcp.cl0         ;191x12=2292 + 10 = 2302
            ret                         ;14
;
.comment
        get.command gets the command sent out from the modem, does
                majority decoding and then places the command
                in mod.command get.command:
            clr     r15
            ld      r12,3               ; command received thrice
r.p10:      ld      r13,8               ; 8 bits to collect
            tm      r2,020h             ; test SCIN for low
            jr      nz,rret             ;
            call    v.bit               ; wait until start bit is over
r.p20:      ld      r14,r2              ; get port info
            rlc     r14
            rlc     r14
            rlc     r14                 ; carry has SCIN bit
            rrc     r15
            call    v.bit
            djnz    r13,r.p20
            call    v.bit               ; wait one stop bit
            call    v.bit               ; wait one more stop bit
            push    r15
            djnz    r12,r.p10
            pop     r15
            ld      r14,r15
            pop     r15
            cp      r14,r15
            jr      z,rret              ; two bytes same - ok
            ld      r13,r14             ; majority decoding
            pop     r15
            cp      r13,r15
            jr      z,rret
            cp      r13,r14
            jr      z,rret
            jr      start
rret:       ld      mod.command,r15
            ret
.comment
        send.command sends the command which is in r15 in the format required
        by the serial protocol send.command:
            ld      r12,3               ; command sent thrice for majority decoding
s.pr:       ld      r13,8               ; 8 bits to send
            and     r2,0f7h             ; start bit
            call    v.bit
s.p10:      ld      r14,0ffh
            rrc     r15                 ; LSB in carry
```

```
            rrc     r14
            swap    r14              ; D0 in bit 3 of r14
            and     r2,r14           ; bit outputted at SCOUT
            call    w.bit
            djnz    r13,sp10
            or      r2,008h          ; stop bit
            call    w.bit
            or      r2,008h          ; stop bit
            call    w.bit
            djnz    r12,s.pr
            ret
;
do.command:
            cp      con.in.proc,1
            jr      nz,dial.com?
            cp      xack,1
            jr      z,reset
            cp      three.sec.flag,1
            jr      nz,main.10
            inc     fail.flag
            cp      fail.flag,3
            jr      gt,start
dial.com?:
            cp      mod.command,0Dh
            jr      le,call.dial
            cp      mod.command,010h
            jr      z,cr
            cp      mod.command,011h
            jr      z,call.on.hook
            cp      mod.command,012h
            jr      z,call.offhook
            cp      mod.command,020h
            jr      z,call.status.info
            cp      mod.command,022h
            jr      z,call.display.info
            cp      mod.command,024h
            jr      z,call.debug
            jr      start            ; error
send.scack:
            ld      sc.command,scack
            call    send.command
reset:      clr     mod.command
            clr     three.sec.flag
            clr     xack.flag
            ld      con.in.proc,001h
            jr      main.10
call.dial:
            cp      mod.command,send
            jr      nz,call.d1
            ld      send.flag,1
            ld      r15,mod.command
            call    dial.cp
            jr      send.SCACK
cr:         cp      send.flag,1
            jr      z,cp.offhook?
            ld      r15,send
            call    dial.cp
cp.offhook?:
            clr     send.flag
            call    off.hook
            and     r2,efh
            ld      in.use.flag,1
            jr      send.SCACK
call.on.hook:
            ld      r15,010h
            call    hook.cp
            jr      send.SCACK
call.off.hook:
            ld      r15,000h
            call    hook.cp
            jr      send.SCACK
call.st.info:
            ld      sc.command,status.info
            call    send.command
            jr      send.SCACK
call.disp.info:
```

```
        ld      sc.command,disp.info
        call    send.command
        jr      send.6CACK
call.debug:
        jr      send.6CACK          ; debug not appropriate for this phone
;

.COMMENT hook.op - takes the fujitsu cellular phone on or off hook.
            R15 is 000 for off hook, 010 for on hook.

do:
            call    hook.cp
            jr      do srp     00c
        r2 - P2 (for hook control)
        r13 - temorary storage
        r15 - hook control hook.cp:
        ld      r13,r2
        and     r13,0efh        ;isolate hook bit
        or      r13,r15         ;get the proper condition
        ld      r2,r13
        ret
;
```

I claim:

1. An interface device for connecting a cellular data modem for transmission of computer data to a cellular telephone device, said cellular telephone device including a cellular bus, comprising:
   a. analog interface means connectable between the cellular data modem and the cellular bus for transmitting signals representing computer data between the data modem and the cellular bus;
   b. processing means connectable to the cellular data modem and the cellular bus for receiving generic digital command signals from the cellular data modem, processing the generic command signals to generate device-specific cellular telephone control signals adapted to control operation of the specific cellular telephone device attached to the interface device, and transmitting the device-specific cellular telephone control signals to the cellular bus.

2. The device of claim 1 wherein the analog interface means is connected to the processing means and operates under control of the processing means to selectively transmit computer data signals between the data modem and the cellular bus.

3. An interface circuit for connecting a computing device to an access device for a radiotelephone network, comprising:
   a first information bus for transmitting data signals between the computing device and the access device;
   a second information bus for carrying digital control signals in a standardized command language, said language including commands for controlling telephone dialing on said radiotelephone network;
   translating means connected between the second information bus and the access device for receiving the standardized command language signals and processing said signals to produce internal command language signals emulating internal command language signals generated by a control unit of the access device and controlling operations in the access device, said internal command language signals being generated in accordance with the standardized command language signals received.

4. The interface circuit of claim 3 further including a standard telephone connector connected to signal lines of the first and second busses for connection of the computing device to said signal lines.

5. A modem interface for connecting a modem to facilitate data transmission over one of at least two types of public communications networks including at least one radiotelephone network which can be selectively accessed through associated communications network access devices connectable to the interface, comprising:

a telephone connector having a plurality of pin connections including tip and ring pins located to operatively connect to a standard landline telephone cable carrying tip and ring lines;
   a first information bus for transmitting data signals between the modem and the access device and connected through said telephone connector to said tip and ring pins;
   a second information bus for carrying digital control signals from the modem for controlling dialing operations on said radiotelephone network, and connected to pin connections of said telephone connector other than said tip and ring pins;
   whereby said telephone connector provides a tip and ring interface between said modem and said communications network access device when said standard landline telephone cable is connected therebetween and provides a digital interface permitting the modem to control dialing operations of said communications network access device associated with said radiotelephone network when a cable providing connections to said second information bus is connected therebetween.

6. An interface device for connecting a data modem for transmission of computer data to a radiotelephone device, said radiotelephone device including a radiotelephone bus, comprising:

a. analog interface means connectable between the data modem and the radiotelephone bus for transmitting signals representing computer data between the data modem and the radiotelephone bus;

b. processing means connectable to the data modem and the radiotelephone bus by a pathway separate from said analog interface means for receiving generic digital command signals from the data modem, processing the generic digital command signals to generate device-specific cellular telephone control signals controlling operation of the specific radiotelephone device attached to the interface device, and transmitting the device-specific radiotelephone control signals to the radiotelephone bus.

7. An interface circuit for connecting a computing device to one of a plurality of access devices for a radio communications network to achieve data transfer with a remote station, comprising:

computer interface means for transferring information between the interface circuit and a portable personal computing device;

cable means for establishing predetermined line connections to a specified one of said access devices in said radio communications network to control address specification and data transmission functions of the access device;

information storage means for receiving and storing at least one of a plurality of possible program data sets defining digital control signals for at least one type of radio communications network access device bus, according to a standard protocol of said bus, and for defining line connections over which said signals are to be transmitted in conjunction with said predetermined line connections established by said cable means; and control means connected to the computer interface means, the cable means, and the information storage means for receiving operational commands from the portable personal computing device, and in response to said commands retrieving a program data set from the program storage means compatible with the access device connected to said cable means, generating addressing signals to initiate data transfer with the remote station using said access device and said radio communications network, and for transferring data with the remote station.

8. The interface circuit of claim 7 wherein said communication network is a cellular radiotelephone network, and said access device is a cellular radiotelephone.

9. The interface circuit of claim 8 further comprising input means for receiving a user input specifying a type of cellular radiotelephone to be used, and selection means connected to said control means and said input means for causing the control means to retrieve and use a program data set relating to the radiotelephone specified by said user input for generating addressing signals.

10. The interface circuit of claim 7 further comprising modem means for modulating and demodulating data transferred between said computing device and the remote station.

11. The interface circuit of claim 7 wherein said computer interface means comprises a standardized connector mating with a corresponding connector in the portable personal computing device to operably connect the interface circuit for data transfer with the portable personal computing device.

12. The interface circuit of claim 11 wherein said standardized connector is a card slot connector.

13. The interface circuit of claim 7 wherein said cable means includes at least one separable connector which receives one of a plurality of cables, each said cable associated with a specific type of access device and having a plurality of lines extending between a connector compatible with said separable connector and a connector compatible with said specific type of access device.

14. The interface circuit of claim 13 wherein a program data set is associated with each said cable so that the control means transmits information sufficient to initiate a radio transmission, according to a standard protocol of the access device bus in conjunction with said predetermined line connections established by said cable.

15. The interface circuit of claim 14 wherein a plurality of said program data sets are simultaneously available in said program storage means.

16. The interface circuit of claim 7 wherein said line connections include at least one data line for transmitting and receiving data and at least one control signal line separate from the data line for controlling addressing and operation of the access device.

17. The interface circuit of claim 16 wherein the transmissions of said control signal lines vary according to the program data set retrieved by the control means.

18. The interface circuit of claim 17 wherein said line connections include a receive data line and a transmit data line forming a receive and transmit interface with the access device.

19. An interface circuit for connecting a computing device to an access device for a radio communications network to achieve data transfer with a remote station, comprising:

computer connection means for receiving and processing information from a portable personal computing device and for processing and transmitting information to the portable personal computing device;

control means connected to the computer connection means for receiving operational commands from the portable personal computing device, and in response to said commands retrieving a program data set and generating addressing signals to initiate data transfer with the remote station using said access device and said radio communications network; and an access-device-specific operating combination, including a cable means for establishing predetermined line connections to a specified one of said access devices in said radio communications network to control address specification and data transmission functions of the access device, said cable means having a connector compatible with a connector of the access device, and a program data set defining digital control signals for the access device in conjunction with said predetermined line connections.

20. The interface circuit of claim 19 wherein said communication network is a cellular radiotelephone network, and said access device is a cellular radiotelephone.

21. The interface circuit of claim 20 further comprising input means for receiving a user input specifying a type of cellular radiotelephone to be used, and selection means connected to said control means and said input means for causing the control means to retrieve and use a program data set relating to the radiotelephone specified by said user input for generating addressing signals.

22. The interface circuit of claim 19 wherein said computer connection means comprises a standardized connector mating with a corresponding connector in the portable personal computing device to operably connect the interface circuit for data transfer with the portable personal computing device.

23. The interface circuit of claim 22 wherein said standardized connector is a card slot connector.

24. The interface circuit of claim 19 wherein said cable means includes at least one separable connector which receives one of a plurality of cables, each said cable associated with a specific type of access device and having a plurality of lines extending between a connector compatible with said separable connector and a connector compatible with said specific type of access device.

25. The interface circuit of claim 24 wherein a program data set is associated with each said cable so that the control means transmits information sufficient to initiate a radio transmission, according to a standard protocol of the access device bus in conjunction with said predetermined line connections established by said cable.

26. The interface circuit of claim 25 wherein a plurality of said program data sets are simultaneously available in said interface circuit.

27. The interface circuit of claim 19 wherein said line connections include at least one data line for transmitting and receiving data and at least one control signal line separate from the data line for controlling addressing and operation of the access device.

28. The interface circuit of claim 27 wherein the transmissions of said control signal lines vary according to the program data set in use.

29. The interface circuit of claim 28 wherein said line connections include a receive data line and a transmit data line forming a receive and transmit interface with the access device.

* * * * *